(12) United States Patent
Munetsugu et al.

(10) Patent No.: US 10,650,314 B2
(45) Date of Patent: May 12, 2020

(54) DEVICE MANAGEMENT METHOD AND DEVICE MANAGEMENT APPARATUS

(71) Applicant: Panasonic Intellectual Property Management Co., Ltd., Osaka (JP)

(72) Inventors: Toshihiko Munetsugu, Osaka (JP); Hayashi Ito, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 836 days.

(21) Appl. No.: 15/267,853

(22) Filed: Sep. 16, 2016

(65) Prior Publication Data

US 2017/0011300 A1 Jan. 12, 2017

Related U.S. Application Data

(63) Continuation of application No. PCT/JP2016/001374, filed on Mar. 11, 2016.

(30) Foreign Application Priority Data

May 27, 2015 (JP) .................. 2015-107393
Feb. 3, 2016 (JP) .................. 2016-018718

(51) Int. Cl.
*G06N 5/04* (2006.01)
*H04Q 9/00* (2006.01)
(Continued)

(52) U.S. Cl.
CPC ............ *G06N 5/04* (2013.01); *H02J 13/0006* (2013.01); *H04L 12/2823* (2013.01);
(Continued)

(58) Field of Classification Search
CPC ......... G06N 5/04; G01R 21/133; H02J 13/00; H02J 13/00002; H04L 12/2823; H04L 12/2825

See application file for complete search history.

(56) References Cited

U.S. PATENT DOCUMENTS

2010/0191487 A1 7/2010 Rada et al.
2011/0251807 A1* 10/2011 Rada .................. G01D 4/00
702/61

FOREIGN PATENT DOCUMENTS

JP 2002-311070 10/2002
JP 2010-193638 9/2010
(Continued)

OTHER PUBLICATIONS

International Search Report of PCT application No. PCT/JP2016/001374 dated May 31, 2016.

*Primary Examiner* — Benjamin P Geib
(74) *Attorney, Agent, or Firm* — Greenblum & Bernstein, P.L.C.

(57) ABSTRACT

A device management method of a device management apparatus that manages information of devices installed in a home, includes: acquiring electric power consumption per unit time in predetermined time intervals, for each of branch circuits of a power distribution board to which the devices can be connected; estimating existence of the devices connected to the branch circuit, based on change of electric power consumption over time, per unit time; condition determining whether or not an estimated device, which is a device regarding which existence has been estimated in the estimating, satisfies a predetermined condition; and transmitting inquiry information to a user in accordance with the predetermined condition, only in a case where determination (Continued)

is made in the condition determining that the estimated device satisfies the predetermined condition.

4 Claims, 26 Drawing Sheets

(51) Int. Cl.
    *H04L 12/28*     (2006.01)
    *H02J 13/00*     (2006.01)

(52) U.S. Cl.
    CPC ........... *H04L 12/2825* (2013.01); *H04Q 9/00* (2013.01); *Y02B 70/325* (2013.01); *Y04S 20/228* (2013.01)

(56) References Cited

FOREIGN PATENT DOCUMENTS

| | | |
|---|---|---|
| JP | 2011-018110 | 1/2011 |
| JP | 2012-516133 A | 7/2012 |
| JP | 2012-170285 | 9/2012 |
| JP | 2013-171379 | 9/2013 |
| WO | 2010/085816 A1 | 7/2010 |

\* cited by examiner

| BRANCH NO. 601 | TYPE OF DEVICE 602 | MODEL NO. 603 | NO. 604 | DATE DETECTED 605 | PREVIOUS DATE DETECTED 606 | NUMBER OF CONSECUTIVELY-DETECTED DAYS 607 |
|---|---|---|---|---|---|---|
| CT00 | AIR CONDITIONER | AC-001 | 0 | 2015/12/23 | 2015/12/15 | 1 |
| CT01 | TELEVISION | TV-001 | 0 | 2015/12/23 | 2015/12/22 | 250 |
| CT01 | PLAYER | PL-001 | 0 | 2015/12/20 | 2015/12/19 | 2 |
| CT01 | PLAYER | PL-001 | 1 | 2015/12/5 | 2015/11/1 | 1 |
| CT02 | LIGHTING | L-0200 | 0 | 2015/12/23 | 2015/12/22 | 250 |
| CT03 | | | | | | |
| CT04 | AIR CONDITIONER | AC-001 | 0 | 2015/12/23 | 2015/12/22 | 10 |
| | | | | | | |

FIG. 7

| TIME | CT00 | CT01 | CT02 | ... | CTnn | |
|------|------|------|------|-----|------|---|
| 9:00 | 2 | 1 | 0 | ... | — | ~711 |
| 9:01 | 1 | 1 | 0 | ... | 1 | ~712 |
| 9:02 | 3 | 5 | 0 | ... | 1 | ~713 |
| 9:03 | 3 | 2 | 0 | ... | 1 | ~714 |
| 9:04 | 2 | 3 | 0 | ... | 1 | ~715 |
| 9:05 | 1 | 3 | 0 | ... | 1 | ~716 |
|  |  |  |  |  |  | |

| TYPE OF DEVICE | MODEL NO. | OPERATION/ACTION | INDEX |
|---|---|---|---|
| AIR CONDITIONER | AC-001 | START HEATING | AC-001-W-0 |
| AIR CONDITIONER | AC-001 | START COOLING | AC-001-C-0 |
| TELEVISION | TV-001 | POWER ON | TV-001-0 |
| TELEVISION | TV-001 | POWER OFF | TV-001-1 |
| WASHING MACHINE | W-001 | START WASHING | W-001-W-0 |
| WASHING MACHINE | W-001 | END WASHING | W-001-W-1 |
| WASHING MACHINE | W-001 | START DRYING | W-001-D-1 |
|  |  |  |  |

| INDEX | DATA COUNT | DATA STRING |
|---|---|---|
| AC-001-W-0 | 10 | 2,5,2,5,2,5,2,5,1,5 |
| AC-001-C-0 | 10 | 2,5,5,5,5,1,1,5,1 |
| TV-001-0 | 5 | 5,5,3,2,1 |
| TV-001-1 | 5 | 1,2,2,0,0 |
| W-001-W-0 | 10 | 1,0,1,0,1,0,1,5,5,2 |
| W-001-W-1 | 10 | 3,3,3,2,2,1,1,1,0,0 |

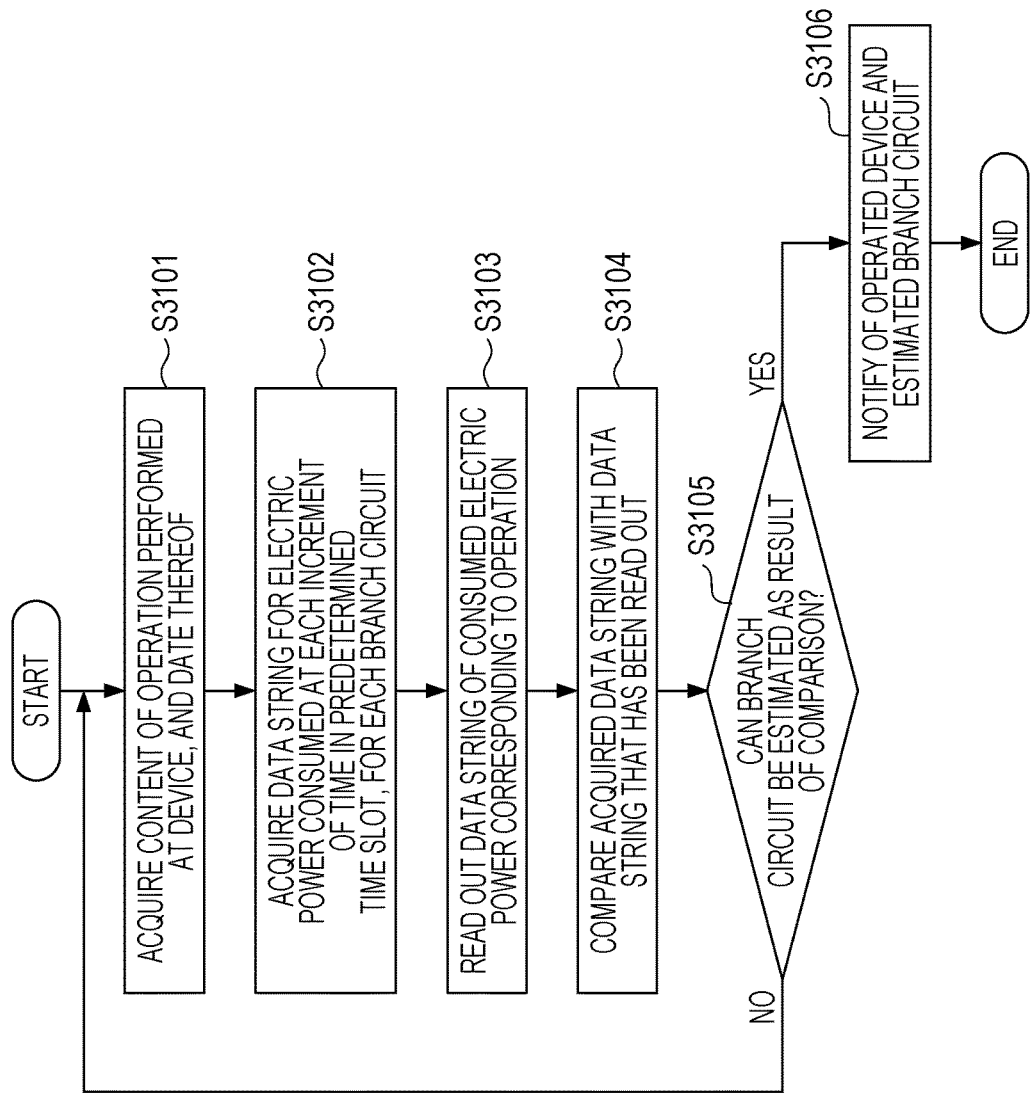

DEVICE MANAGEMENT METHOD AND DEVICE MANAGEMENT APPARATUS

BACKGROUND

1. Technical Field

The present disclosure relates to a device managing apparatus and a device managing method that handle device using electric power, such as home appliances and the like.

2. Description of the Related Art

In addition to conventionally-used main trunk electric power representing the overall amount of electric power being consumed in homes, as an increment to measure the amount of electric power consumed in homes, the amount of electric power consumption for each branch circuit (branch breaker) has come to be used in recent years. This amount of electric power consumed for each branch circuit is also being used to improve awareness of energy conservation and the like.

There is a movement to manage branch circuits, and home appliances connected to the branch circuits, and to communicate information regarding the home appliances to the user so as to encourage energy conservation. Although connection of branch circuits and home appliances generally is performed manually by the user, there are attempts at automating this. For example, Japanese Unexamined Patent Application Publication No. 2010-193638 describes estimating connected home appliances based on operation history of the home appliances and change in electric power consumption of branch circuits, and notifying the user. Japanese Unexamined Patent Application Publication No. 2011-018110 describes managing information of branch circuits and home appliances connected to the branch circuits, comparing the amount of estimated electric power consumption calculated based on operation history of the home appliances with the amount of actual electric power consumption measured for each branch circuit, estimating change in home appliances connected to the branch circuits, and notifying the user.

In the technology in Japanese Unexamined Patent Application Publication Nos. 2010-193638 and 2011-018110, estimation results of connected home appliances or estimation results of change in home appliances connected to branch circuits, are always notified to the user. However, it is conceivable that doing away with unnecessary notifications to the user can improve ease of use for the user.

SUMMARY

One non-limiting and exemplary embodiment provides a device management method and device management apparatus with improved ease of use for the user by doing away with unnecessary notifications to the user.

In one general aspect, the techniques disclosed here feature a device management method of a device management apparatus that manages information of devices installed in a home includes: acquiring electric power consumption per unit time in predetermined time intervals, for each of branch circuits of a power distribution board to which the devices can be connected; estimating existence of the devices connected to the branch circuit; based on change of electric power consumption over time, per unit time; condition determining whether or not an estimated device, which is a device regarding which existence has been estimated in the estimating, satisfies a predetermined condition; and transmitting inquiry information to a user in accordance with the predetermined condition, only in a case where determination is made in the condition determining that the estimated device satisfies the predetermined condition.

According to the above aspect, inquiry information is transmitted to the user in accordance with predetermined conditions, only in a case where an estimated device regarding which existence has been estimated satisfies predetermined conditions, so unnecessary notifications to the user are done away with and the load of the device management apparatus transmitting information can be reduced, and also ease of use of the user can be improved.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 6 is a diagram schematically illustrating an example of device information according to the first embodiment;

FIG. 7 is a diagram illustrating an example of electric power consumption data according to the first embodiment;

FIG. 8 is a diagram schematically illustrating an example of operation correspondence information according to the first embodiment;

FIG. 9 is a diagram schematically illustrating an example of electric power information according to the first embodiment;

FIG. 33 is a diagram illustrating an operation flow of the correlation detecting unit according to the fifth embodiment.

DETAILED DESCRIPTION

Figure 1:
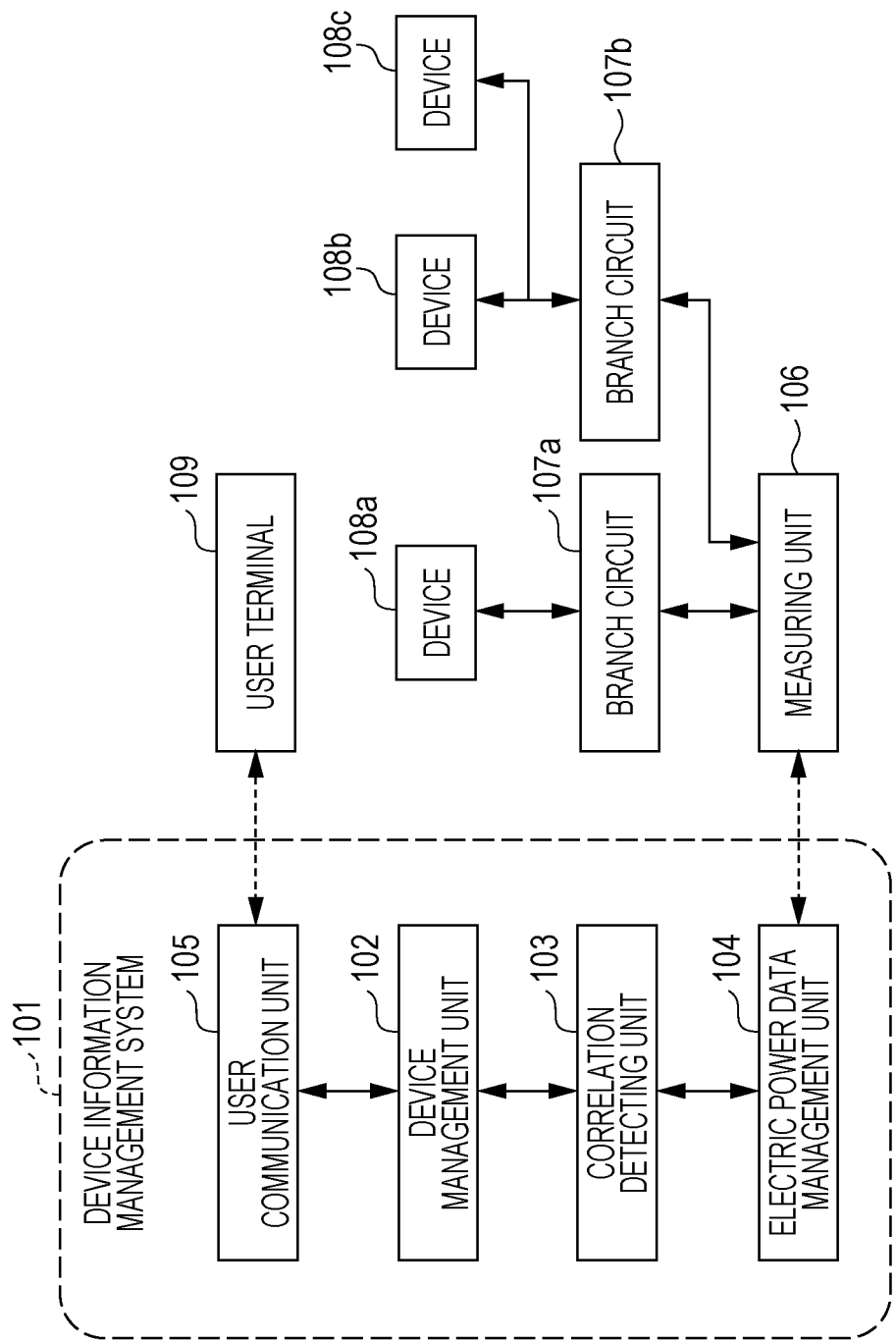
FIG. 1 is a block diagram illustrating an example of the configuration of a device information management system according to a first embodiment.

Underlying Knowledge Forming Basis of the Present Disclosure

Electric power consumption has come to be measured and used in individual branch circuits (branch breakers) to increase awareness of energy conservation. Accordingly, technology to automatically correlate branch circuits and home appliances connected to the branch circuits is being studied. However, study has been insufficient regarding creating values that can be provided to the user, such as ease of use and handiness. For example, a device that consumes large amounts of electric power such as an air conditioning device (hereinafter referred to as "air conditioner") often uses a branch circuit alone. Accordingly, there is little need to inquire of the user regarding newly installing or relocating or the like of such devices.

Also, devices are detected in processing of association (correlation) between branch circuit and device. Accordingly, information suitable for the devices can be provided to the user. For example; notification can be made to the user that is suitable for the type of device or state of the device, such as when a seasonal product such as a fan heater or fan or the like that has been out of use for a certain amount of time is detected, the user can be prompted to check the state of the device so that it can be safely used.

In light of the above studies, the Present Inventors have reached the invention of the forms disclosed below.

According to one form of the present disclosure, a device management method of a device management apparatus that manages information of devices installed in a home includes:

acquiring electric power consumption per unit time in predetermined time intervals, for each of branch circuits of a power distribution board to which the devices can be connected;

estimating existence of the devices connected to the branch circuit, based on change of electric power consumption over time, per unit time;

condition determining whether or not an estimated device, which is a device regarding which existence has been estimated in the estimating, satisfies a predetermined condition; and transmitting inquiry information to a user in accordance with the predetermined condition, only in a case where determination is made in the condition determining that the estimated device satisfies the predetermined condition.

Accordingly, only in a case where the estimated device, of which the existence has been estimated, satisfies a predetermined condition, is inquiry information transmitted to the user. Accordingly, unnecessary notifications to the user are done away with and the load of the device management apparatus transmitting information can be reduced, and also ease of use of the user can be improved.

In the above form, for example, in the condition determining, if determination is made that the estimated device is a newly-installed device that has been newly installed in the home, determination may made that the predetermined condition is not satisfied.

In a case where the estimated device is a newly-installed device newly installed in the home, there is little necessity to inquire of the user. Accordingly, in this form, if determination is made that the estimated device is a newly-installed device, determination is made that the predetermined condition is not satisfied, so inquiry information is not transmitted to the user. Thus, ease of use of the user can be improved.

In the above form, for example, in the condition determining, management information may be referenced in which devices existing within the home and the branch circuits are correlated by the branch circuits, and in a case where the estimated device is not registered in the management information, determination may be made that the estimated device is the newly-installed device.

Accordingly, determination can be made regarding whether or not the estimated device of which the existence has been estimated is a newly-installed device that has been newly installed in the home, based on management information where devices existing in the home and branch circuits are correlated.

In the above form, for example,
the condition determining may include
first device determining where determination is made regarding whether or not another already-existing device has been correlated with a branch circuit to which the newly-installed device has already been correlated in the management information,
second device determining where, in a case that determination has been made in the first device determining that the already-existing device has been correlated with a branch circuit to which the newly-installed device has been correlated, determination is made regarding whether or not the newly-installed device is a device that independently uses the branch circuit as a dedicated branch circuit, and
third device determining where, in a case that determination has been made in the second device determining that the newly-installed device uses the dedicated branch circuit, determination is made that the already-existing device has been replaced by the newly-installed device.

In a case where determination is made in the third device determining that the already-existing device has been replaced by the newly-installed device, determination may be made in the condition determining that the predetermined condition is not satisfied.

Accordingly, in a case where the newly-installed device determined to have been newly installed in the home uses a dedicated branch circuit, determination is made that the already-existing device that had been connected to the dedicated branch circuit correlated with the newly-installed device has been replaced by the newly-installed device. Accordingly, there is little necessity to inquire of the user, so determination is made that the predetermined condition is not satisfied, and inquiry information is not transmitted to the user. Thus, ease of use of the user can be improved.

In the above form, for example,
the condition determining may include
new installation determining where management information is referenced in which devices existing within the home and the branch circuits are correlated by the branch circuits, and in a case where the estimated device is not registered in the management information, determination is made that the estimated device is a newly-installed device that has been newly installed in the home,
first device determining where determination is made regarding whether or not another already-existing device has already been correlated with a branch circuit to which the newly-installed device has been correlated in the management information, and
second device determining where, in a case that determination has been made in the first device determining that the already-existing device has already been correlated with a branch circuit to which the newly-installed device has been correlated in the management information, determination is made regarding whether or not the newly-installed device is a device that shares the branch circuit as a shared branch circuit with other devices.

In the condition determining, if determination is made in the second device determining that the newly-installed device uses the shared branch circuit, determination may be made that the estimated device satisfies the predetermined condition.

In the transmitting, information may be transmitted to the user for confirmation of whether or not the already-existing device exists, as the inquiry information.

In the condition determining, determination is made whether or not to update information relating to the already-existing device in the management information, in accordance with the content of the response as to the inquiry information.

Accordingly, in a case where the newly-installed device determined to have been newly installed in the home uses a shared branch circuit, there is need to inquire of the user whether or not the already-existing device connected to that shared branch circuit correlated with the newly-installed device exists, so determination is made that the estimated device satisfies the predetermined condition. As a result, information for confirmation with the user whether or not the already-existing device exists is transmitted as inquiry information. Whether or not the already-existing device has been replaced by the newly-installed device can be determined based on the response to the inquiry information. Accordingly, whether or not to update information relating to the already-existing device in the management information can be determined.

In the above form, for example,
in the condition determining, if determination is made that the estimated device is a relocated device that has been relocated from a first location corresponding to a first branch circuit to which the estimated device had already been connected, to a second location corresponding to a second branch circuit, determination may be made that the estimated device satisfies the predetermined condition.

In a case where the estimated device is a relocated device relocated from a first location in the home to a second location, the necessity to inquire of the user regarding whether the relocation is temporary or not is high. Accordingly, determination is made that the estimated device satisfies the predetermined condition, so inquiry information can be transmitted to the user.

In the above form, for example,
in the condition determining, management information may be referenced in which devices existing within the home and the branch circuits are correlated by the branch circuits, and in a case where the estimated device estimated to be connected to the second branch circuit in the estimating exists in the management information, and also is correlated with the first branch circuit that is different from the second branch circuit, determination may be made that the estimated device is the relocated device.

Accordingly, determination can be made regarding whether or not the estimated device regarding which existence has been estimated is a relocated device, based on management information where devices existing in the home and branch circuits are correlated.

In the above form, for example,
the condition determining may include
relocation determining where management information is referenced in which devices existing within the home and the branch circuits are correlated by the branch circuits, and in a case where the estimated device estimated to be connected to the first branch circuit in the estimating exists in the management information, and also is correlated with the second branch circuit that is different from the first branch circuit, determination is made that the estimated device is a relocated device that has been relocated from the first location of connection to the second branch circuit to the second location of connection to the first branch circuit, and device determining where, in a case that the estimated device is determined in the relocation determining to be the relocated device, determination is made regarding whether or not the relocated device is a device that independently uses the branch circuit as a dedicated branch circuit.

In the condition determining, if determination is made in the device determining that the relocated device does not use the dedicated branch circuit, determination may be made that the estimated device satisfies the predetermined condition.

In the transmitting, information may be transmitted to the user for confirmation regarding whether or not the relocation of the relocated device from the first location to the second location is temporary, as the inquiry information.

Accordingly, if determination is made that the estimated device already existing in the home is a relocated device that has been relocated to another location in the home, determination is made regarding whether or not the relocated device uses a dedicated branch circuit. In a case where determination is made that the relocated device does not use a dedicated branch circuit, information for appropriately determining whether or not the relocation is temporary and does not need management as relocation, can be obtained from the user.

In the above form, for example, the condition determining may include relocation determining where management information is referenced in which devices existing within the home and the branch circuits are correlated by the branch circuits, and in a case where the estimated device estimated to be connected to the first branch circuit in the estimating exists in the management information, and also is correlated with the second branch circuit that is different from the first branch circuit, determination is made that the estimated device is a relocated device that has been relocated from the first location of connection to the second branch circuit to the second location of connection to the first branch circuit, and device determining where, in a case that the estimated device is determined in the relocation determining to be the relocated device, determination is made regarding whether or not the relocated device is a device that independently uses the branch circuit as a dedicated branch circuit.

If determination is made in the device determining that the relocated device uses the dedicated branch circuit, determination may be made in the condition determining that the estimated device does not satisfy the predetermined condition.

Accordingly, in a case where determination is made that the estimated device already existing in the home is a relocated device that has been relocated to another location in the home, determination is made regarding whether or not the relocated device uses a dedicated branch circuit. In a case where determination is made that the relocated device does uses a dedicated branch circuit, it is conceivable that the relocation is not temporary. Accordingly, the necessity to inquire of the user is low, so determination is made that the estimated device does not satisfy the predetermined condition, and inquiry information is not transmitted. Accordingly, ease of use of the user can be improved.

In the above form, for example, in the condition determining, in a case where the estimated device has not been used for a predetermined period or longer, determination may be made that the predetermined condition is satisfied.

Accordingly, in a case where the estimated device is not used for a predetermined period or longer, determination is made that the predetermined condition is satisfied. Accordingly, inquiry information can be transmitted to the user in accordance with estimated device having not been used for a predetermined period or longer.

In the above form, for example, in the condition determining, management information may be referenced in which devices existing within the home and the branch circuits are correlated by the branch circuits, and in a case where the estimated device is registered in the management information and also existence thereof has not been estimated in the estimating for a predetermined period or longer, determination may be made that the estimated device has not been used for the predetermined period or longer.

The estimated device being registered in the management information where devices existing in the home and branch circuits are correlated, and also existence having not been estimated in the estimating for a predetermined period or longer, means that the estimated device has not been consuming electric power for a predetermined period or longer. Accordingly, determination can be made regarding whether or not the estimated device has been out of use for a predetermined period or longer, based on the management information.

In the above form, for example, in a case where determination is made in the condition determining that the estimated device has not been used for the predetermined period or longer, information may be transmitted in the transmitting to prompt the user to inspect the estimated device.

Accordingly, in a case where the estimated device estimated to already exist in the home has not been used for a predetermined period or longer, information can be transmitted to prompt the user to inspect the estimated device for safe use.

In the above form, for example, in the condition determining, in a case where the estimated device has been continuously used for a predetermined period or longer, determination may be made that the predetermined condition is satisfied.

Accordingly, in a case where the estimated device has been continuously used for a predetermined period or longer, determination is made that the predetermined condition is satisfied, so inquiry information can be transmitted to the user in accordance with continued use for the predetermined period or longer.

In the above form, for example, in the condition determining, management information may be referenced in which devices existing within the home and the branch circuits are correlated by the branch circuits, and in a case where the estimated device is registered in the management information and also existence thereof has been continuously estimated in the estimating for a predetermined period or longer, determination may be made that the estimated device has been continuously used for the predetermined period or longer.

The estimated device being registered in the management information where devices existing in the home and branch circuits are correlated, and also existence having been continuously estimated in the estimating for a predetermined period or longer, means that the estimated device has continuously been consuming electric power for a predetermined period or longer. Accordingly, determination can be made regarding whether or not the estimated device has been out of use for a predetermined period or longer, based on the management information.

In the above form, for example, in the transmitting, in a case where determination is made in the condition determining that the estimated device has been continuously used for the predetermined period or longer, information may be transmitted in the transmitting to prompt the user to confirm the state of a part used in the estimated device.

Accordingly, in a case where the estimated device estimated to already exist in the home has been continuously used for a predetermined period or longer, information can be transmitted to prompt the user to confirm the state of a part (e.g., an air conditioner filter) used in the estimated device.

In the above form, for example, in the estimating, information of change in electric power consumption over time, per unit time in accordance with operation of the device, may be referenced, and the referenced information of change over time may be compared with change over time of electric power consumption per unit time at the branch circuit acquired in the acquiring at predetermined time intervals, thereby estimating the existence of the device connected to the branch circuit.

Accordingly, the existence of the device can be appropriately estimated by comparing information of change over time of electric power consumption per unit time accompanying operations of the device with change over time of electric power consumption per unit time at the branch circuit acquired in the acquiring at predetermined time intervals.

According to another form of the present disclosure, a device management method of a device management apparatus that manages information of devices installed in a home includes:

first acquiring electric power consumption per unit time in predetermined time intervals, for each of branch circuits of a power distribution board to which the devices can be connected;

second acquiring information relating to content of an operation performed as to the device, and clock time at which the operation was performed;

estimating a branch circuit to which the device, to which the operation was performed, is connected, based on change over time of the electric power consumption per unit time in a predetermined time including the clock time at which the operation was performed as to the device;

determining whether or not the device to which the operation was performed satisfies the predetermined condition, based on the change over time of the electric power consumption per unit time; and transmitting inquiry information to a user in accordance with the predetermined condition, only in a case where determination is made in the determining that the device to which the operation was performed satisfies the predetermined condition.

Accordingly, only in a case where the estimated device, of which the existence has been estimated, satisfies a predetermined condition, is inquiry information transmitted to the user in accordance with that predetermined condition. Accordingly, unnecessary notifications to the user are done away with and the load of the device management apparatus transmitting inquiry information can be reduced, and also ease of use of the user can be improved.

Note that the embodiments described below each indicate a preferred specific example of the present invention. That is to say, values, shapes, components, steps, orders of steps, and so forth in the following embodiments are only exemplary, and are not intended to restrict the present invention. Components in the following embodiments which are not included in an independent Claim of the present invention indicating the highest concept are described as being optional components. Also note that the contents of each of the embodiments can be combined with each other. In the drawings, the same components are denoted by the same reference numerals, and detailed description thereof will be omitted as appropriate.

First Embodiment

A first embodiment of a device information management system according to the present disclosure will be described below with reference to the drawings. FIG. 1 is a block diagram schematically illustrating the configuration of a device information management system according to the first embodiment of the present disclosure. In FIG. 1, the device information management system 101 according to the first embodiment includes a device management unit 102, a correlation detecting unit 103, an electric power data management unit 104, and a user communication unit 105. The device information management system 101 includes a central processing unit (CPU) and memory, for example. Note that the device information management system 101 is not restricted to a CPU, and may include other hardware.

A device 108a is a device that independently uses a branch circuit 107a (an example of a dedicated branch circuit), such as an air conditioner, a natural-refrigerant heat-pump water heater, or the like, for example. Devices 108b and 108c are devices that collectively use a branch circuit 107b (an example of a shared branch circuit 107), such as a washing machine, microwave oven, television receiver (hereinafter referred to as "television"), and so forth, for example. Power lines in a home generally have external electric power branched into the branch circuits 107a and 107b via individual breakers. A measuring unit 106 measures electric power consumption for each of the branch circuits 107a and 107b. Hereinafter, when the branch circuits 107a and 107b are not distinguished, they will be collectively referred to as "branch circuit 107", and when the devices 108a, 108b, and 108c are not distinguished, they will be collectively referred to as "device 108".

A user terminal 109 typically is an information terminal that the user uses, such as a personal computer, a smartphone, a tablet, or the like. The device information management system 101, measuring unit 106, and user terminal 109 are connected by a network such as the Internet, a Local Area Network (LAN), configured so as to enable mutual communication.

Note that the user terminal 109 may be configured using a monitor and input device provided to the device information management system 101. In this case, the device information management system 101 and user terminal 109 are not configured connected by a network. Although only one branch circuit 107a to which one device is connected is illustrated in FIG. 1, this is not restricted to one. In the same way, although only one branch circuit 107b to which multiple devices are connected is illustrated in FIG. 1, this is not restricted to one.

Figure 2:
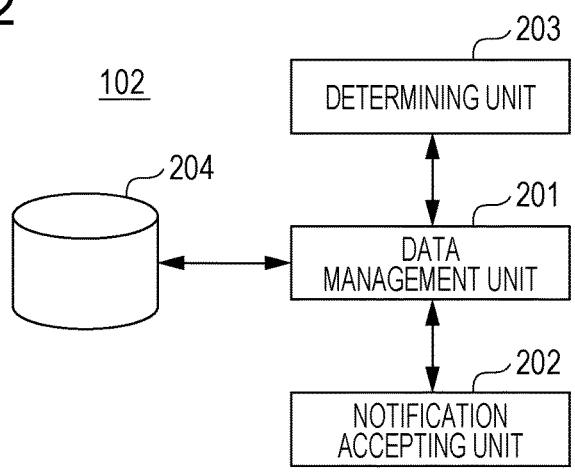
FIG. 2 is a block diagram illustrating an example of the configuration of a device management unit according to the first embodiment.

FIG. 2 is a block diagram schematically illustrating the configuration of the device management unit 102. The device management unit 102 includes a data management unit 201, a notification accepting unit 202, a determining unit 203, and a device information storage unit 204.

The data management unit 201 manages device information 600 (described later with reference to FIG. 6) stored in the device information storage unit 204. The data management unit 201 newly creates device information 600 (an example of management information) or updates device information 600 saved in the device information storage unit 204, based on information received from the notification accepting unit 202 and the contents of determination received from the determining unit 203. The data management unit 201 saves newly-created device information 600 in the device information storage unit 204. The notification accepting unit 202 receives notifications from the correlation detecting unit 103, and hands the received notifications to the data management unit 201.

The determining unit 203 performs determination under request by the data management unit 201. Determination processing by the determining unit 203 will be described later. The device information storage unit 204 stores device information 600 managed by the data management unit 201. The device information storage unit 204 typically is configured using nonvolatile memory, such as a hard disk drive, flash memory, or the like.

Figure 3:
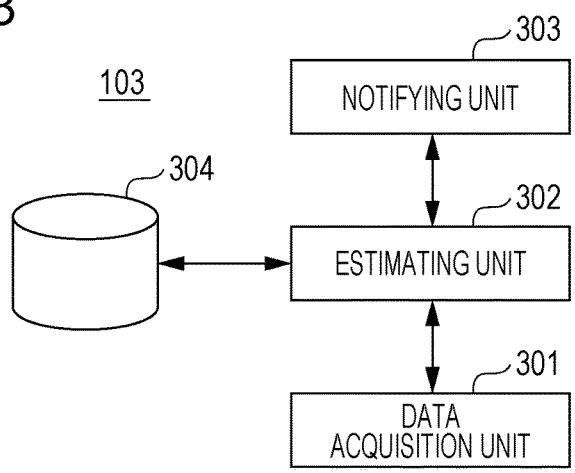
FIG. 3 is a block diagram illustrating an example of the configuration of a correlation detecting unit according to the first embodiment.

FIG. 3 is a block diagram schematically illustrating the configuration of the correlation detecting unit 103. The correlation detecting unit 103 includes a data acquisition unit 301, an estimating unit 302, a notifying unit 303, and an electric power data storage unit 304.

Upon being requested by the estimating unit 302, the data acquisition unit 301 (an example of an acquisition unit) acquires a data string of electric power consumption per unit time in a desired time range, for a desired branch circuit, from the electric power data management unit 104. The estimating unit 302 estimates devices connected to the branch circuits 107a and 107b, by comparing the data string acquired by the data acquisition unit 301 with a data string of electric power consumption saved in the electric power data storage unit 304. In a case of successfully estimated devices connected to the branch circuits 107a and 107b, the estimating unit 302 hands the estimated devices and the branch circuit to which the devices are connected, to the notifying unit 303.

The notifying unit 303 hands the devices and branch circuit handed over from the estimating unit 302, to the device management unit 102. The electric power data storage unit 304 has saved beforehand a data string of electric power consumption per unit time for each device, for when that device operates. The electric power data storage unit 304 typically is configured using nonvolatile memory, such as a hard disk drive, flash memory, or the like.

Figure 4:
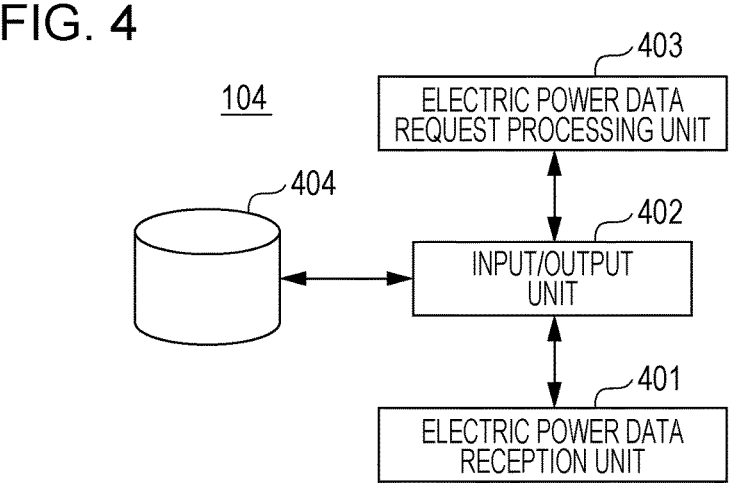
FIG. 4 is a block diagram illustrating an example of the configuration of an electric power data management unit according to the first embodiment.

FIG. 4 is a block diagram schematically illustrating the configuration of the electric power data management unit 104. The electric power data management unit 104 includes an electric power data reception unit 401, an input/output unit 402, an electric power data request processing unit 403, and an electric power data storage unit 404.

The electric power data reception unit 401 communicates with the measuring unit 106 and periodically receives a data string of electric power consumption per unit time for each branch circuit from the measuring unit 106. The electric power data reception unit 401 hands the received data string to the input/output unit 402. The electric power data reception unit 401 in the present embodiment requests the measuring unit 106 for transmission of 20 minutes worth of the newest data string every 20 minutes, for example. The electric power data reception unit 401 receives the data string transmitted from the measuring unit 106 as a response. Note that the electric power data reception unit 401 may receive a data string periodically transmitted from the measuring unit 106.

The input/output unit 402 saves the data string handed over from the electric power data reception unit 401 in the electric power data storage unit 404. The input/output unit 402 reads out from the electric power data storage unit 404 a data string of electric power consumption per unit time for a specified branch circuit and time range, under request from the electric power data request processing unit 403. The input/output unit 402 hands the data string that has been read out to the electric power data request processing unit 403.

The electric power data request processing unit 403 accepts the request from the data acquisition unit 301 of the correlation detecting unit 103, and requests the input/output unit 402 for a data string with the requested branch circuit and time range specified. The electric power data request processing unit 403 receives the specified data string from the input/output unit 402, and hands the received data string to the data acquisition unit 301 of the correlation detecting unit 103. The electric power data storage unit 404 saves the data string for electric power consumption per unit time, for each branch circuit. The electric power data storage unit 404 typically is configured using nonvolatile memory, such as a hard disk drive, flash memory, or the like.

Figure 5:
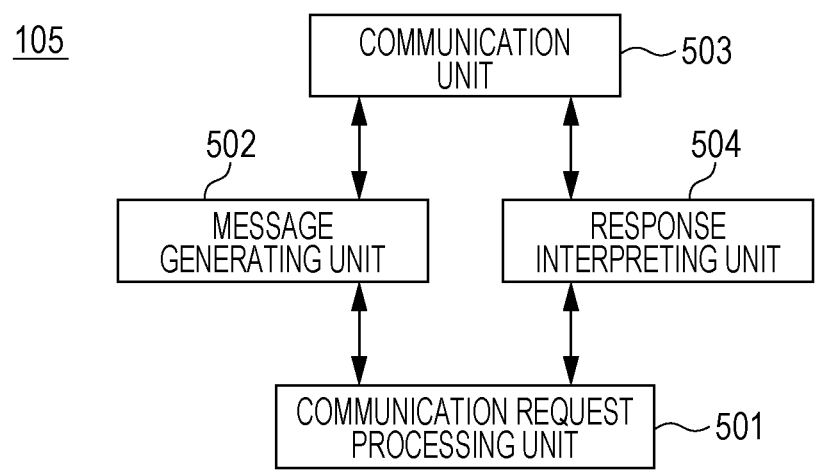
FIG. 5 is a block diagram illustrating an example of the configuration of a user communication unit according to the first embodiment.

FIG. 5 is a block diagram schematic illustrating the configuration of the user communication unit 105. The user communication unit 105 (an example of a transmission unit) includes a communication request processing unit 501, a message generating unit 502, a communication unit 503, and a response interpreting unit 504.

The communication request processing unit 501 receives a request from the determining unit 203 of the device management unit 102, and notifies the content of communication to the message generating unit 502. The communication request processing unit 501 hands the content of the response that the response interpreting unit 504 has interpreted to the determining unit 203 as necessary. The message generating unit 502 also generates a communication message to be transmitted to the user, based on the request received from the communication request processing unit 501.

The communication unit 503 transmits the message that the message generating unit 502 has generated to the user terminal 109. The communication unit 503 receives a response from the user terminal 109 and hands the received response message to the response interpreting unit 504 as necessary. The response interpreting unit 504 interprets the response message handed over from the communication unit 503, and hands the contents thereof to the communication request processing unit 501.

FIG. 6 is a diagram schematically illustrating an example of the device information 600 saved in the device information storage unit 204. The device information 600 includes branch No. 601, type of device 602, model No. 603, No. 604, date detected 605, previous date detected 606, and number of consecutively-detected days 607.

The branch No. 601 represents a symbol identifying the branch circuit. One branch No. is given to each branch circuit. For example, branch No. CT00 corresponds to branch circuit 107a, and, branch No. CT01 corresponds to branch circuit 107b.

the type of device 602 represents the device name of the device connected to the branch circuit corresponding to the branch No. 601. The model No. 603 represents the model No. of the device connected to the branch circuit corresponding to the branch No. 601.

The No. 604 serves to differentiate in a case where multiple devices that are the same are connected to the same branch circuit. For example, two of the same players are connected to branch No. CT01, and accordingly are given serial Nos. as the No. 604. Although the same air conditioners are connected to branch No. CT00 and branch No. CT04, the branch circuits are different, so the No. 604 is the same. The date detected 605, previous date detected 606, and number of consecutively-detected days 607 will be described later. Note that in the first embodiment, the device information 600 does not have to include the date detected 605, previous date detected 606, and number of consecutively-detected days 607. Devices connected to the branch circuit corresponding to branch No. CT03 are not detected in FIG. 6, so the space corresponding to branch No. CT03 is blank.

The device information 600 is not restricted to the data configuration illustrated in FIG. 6. For example, the device information 600 may be configured only of the branch No. to which the device is connected. That is to say, the device information 600 in FIG. 6 may be of a configuration not including the branch No. CT03.

Next, description will be made regarding data of the electric power consumption per unit time that the measuring unit 106 measures for each branch circuit. The measuring unit 106 according to the present embodiment measures electric power consumption per minute. As shown in FIG. 7, the data is imparted time stamps in increments of minutes. Note that data that has been given a time stamp for 9:00 represents electric power consumption from 9:00:00 through 9:00:59.

FIG. 7 is a diagram schematically illustrating an example of a data string for electric power consumption measured by the measuring unit 106. Column 701 in FIG. 7 represents the clock time serving as the time stamp. Columns 702, 703, 704, and 705 each represent electric data strings for electric power consumption at the branch circuits having branch Nos. CT00, CT01, CT02, and so on through CTnn.

Also, row 711 represents data to which the time stamp of 9:00 has been given. Row 712 represents data to which the time stamp of 9:01 has been given. Row 713 represents data to which the time stamp of 9:02 has been given. Row 714 represents data to which the time stamp of 9:03 has been given. Row 715 represents data to which the time stamp of 9:04 has been given. Row 716 represents data to which the time stamp of 9:05 has been given.

The electric power data management unit 104 records the electric power consumption measured by the measuring unit 106 in increments of mWh in the present embodiment. The "-" representing the electric power consumption at clock time 9:00 for branch No. CTmm recorded in the cell at column 705 and row 711 in FIG. 7 means that measurement has failed for some reason.

The electric power data management unit 104 saves in the electric power data storage unit 404 the data string of electric power consumption measured by the measuring unit 106 in table format such as illustrated in FIG. 7. In column 704 in FIG. 7, the electric power consumption for 9:00 through 9:05 is 0. Accordingly, it can be seen that the device connected to the branch circuit corresponding to branch No. CT02 has not operated in this time band.

Figure 10:
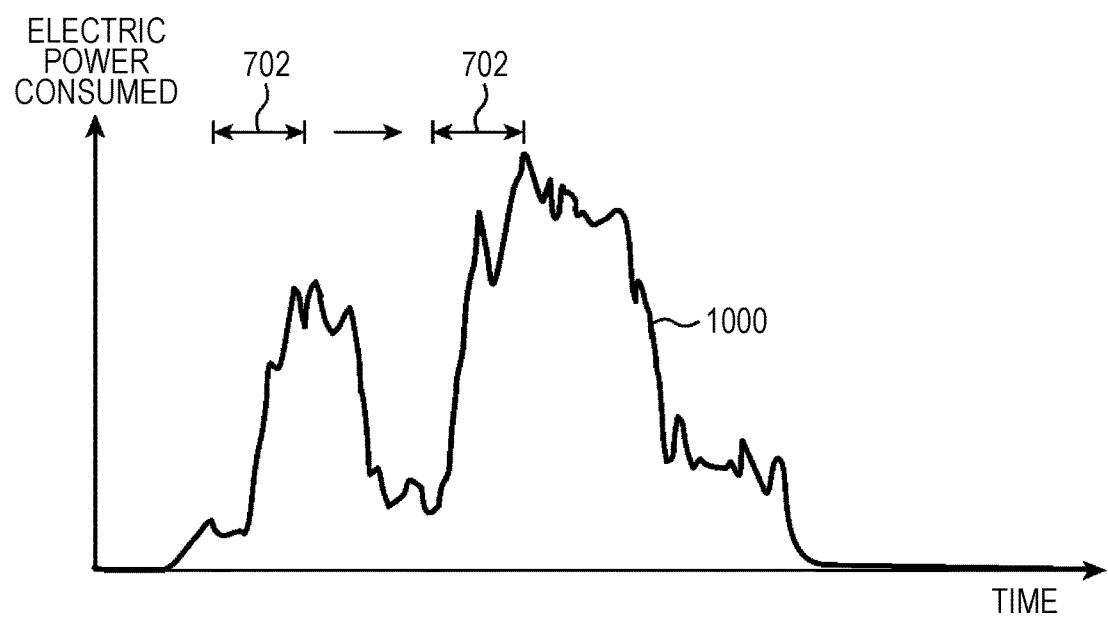
FIG. 10 is a diagram schematically illustrating an example of electric power data according to the first embodiment.

FIGS. 8 through 10 are diagrams schematically illustrating data saved in the electric power data storage unit 304 beforehand. FIG. 8 illustrates an example of operation corresponding information 800, FIG. 9 illustrates an example of electric power information 900, and FIG. 10 illustrates an example of electric power data 1000.

In FIG. 8, the operation corresponding information 800 includes type of device 801, model No. 802, operation/action 803, and index 804. The type of device 801 represents the device name of the device. The model No. 802 represents the model No. of the device, the operation/action 803 represents the operation that has been performed at the device or the action of the device. The index 804 is an identifier for the electric power information 900 (FIG. 9). Each index 804 corresponds to one operation/action 803.

In FIG. 9, the electric power information 900 includes index 901, data count 902, and data string 903. The index 901 is an identifier of the data string 903, and corresponds to the index 804 in the operation corresponding information 800. The data count 902 is the number of data making up the data string 903. The data string 903 is the string of data in time-sequence. One data in the data string 903 represents the amount of electric power consumption in one minute, and the data string 903 represents patterns in change of electric power consumption.

For example, in the first row in FIG. 8, the type of device 801 is "air conditioner", the model No. 802 is "AC-001", the operation/action 803 is "start heating", and the index 804 is "AC-001-W-0". Referencing the index 901 corresponding to this "AC-001-W-0" in the electric power information 900 in FIG. 9 shows that the data string 903 is 2, 5, 2, 5, 2, 5, 2, 5, 1, 5". The data string 903 has been obtained by experimentation, for example, from the transition over time of the electric power consumption when the operation/action 803 is performed by the type of device 801 in FIG. 8.

Thus, the operation corresponding information 800 in FIG. 8 represents the correlation between the operation/action 803 of the type of device 801 and the data string 903 in the electric power information 900 in FIG. 9. The operation corresponding information 800 in FIG. 8 and the electric power information 900 in FIG. 9 are compiled beforehand and saved in the electric power data storage unit 304. Referencing the operation corresponding information 800 in FIG. 8 and the electric power information 900 in FIG. 9 allows the change in the amount of electric power consumption over time of the device to be acquired when the operation/action 803 is performed.

The electric power data 1000 in FIG. 10 is the data string 903 in the electric power information 900 represented in a graph form. The electric power data 1000 in FIG. 10 illustrates how the electric power consumption per minute changes when the operation/action 803 is performed at the device according to the type of device 801. The electric power data 1000 in FIG. 10 may be a graph format representation of the data string 903 (FIG. 9) for operation/action 803 "start washing" to "end washing" for the model No. 801 "washing machine" in FIG. 8, for example.

Figure 11:
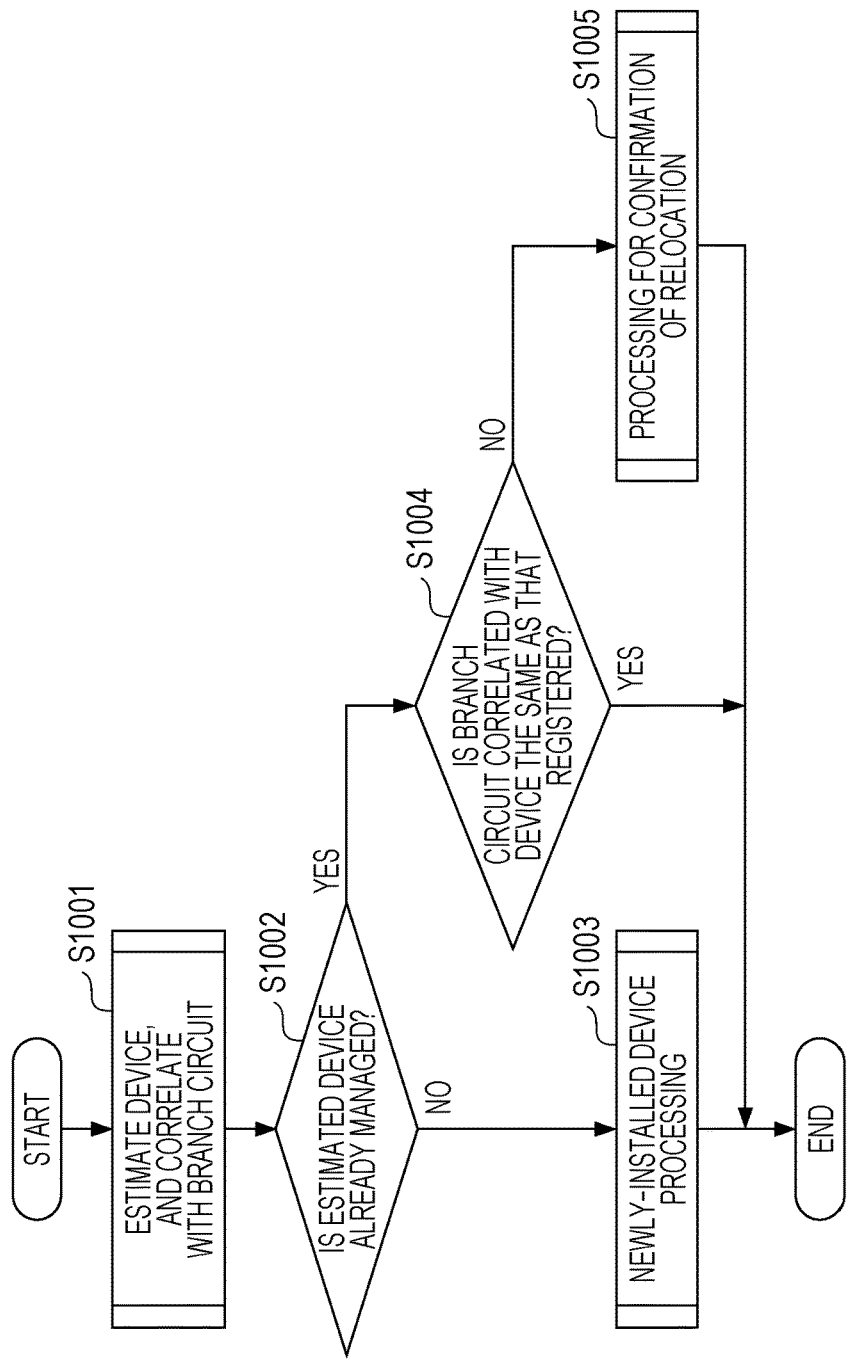
FIG. 11 is a diagram illustrating an operation flow of the device information management system according to the first embodiment.

FIG. 11 is a flowchart schematically illustrating the processing of the device information management system 101 according to the first embodiment. Operations of the device information management system 101 according to the first embodiment will be described below with reference to FIGS. 1 through 5 and 11.

In the device information management system 101 according to the first embodiment, the electric power data management unit 104 for example monitors the electric power consumption of each of the branch circuits 107a and 107*b* measured by the measuring unit 106. Upon the electric power data management unit 104 detecting change in electric power consumption equal to or above a threshold value (e.g., 1 mWh per minute), the operation in FIG. 11 is started.

First, in step S1001, the correlation detecting unit 103 estimates the type of device (e.g., air conditioner) by interpreting change in electric power consumption per minute, for each branch circuit, and correlates an estimated device that has been estimated with a branch circuit. The details of this processing will be described later in detail with reference to FIG. 12.

Next, in step S1002 (an example of a condition determining step, an example of a new-installation determining step), the data management unit 201 of the device management unit 102 references the device information 600 saved in the device information storage unit 204, and determines whether or not the estimated device estimated in step S1001 is a device already managed by the device management unit 102 (i.e., a device registered in the device information 600). In a case where the estimated device is not a device already managed (NO in step S1002), the flow advances to step S1003. On the other hand, in a case where the estimated device is a device already managed (YES in step S1002), the flow advances to step S1004.

In step S1003, the estimated device is conceived to be a newly-installed device that has been newly installed, so the device management unit 102 performs newly-installed device processing. The details of this processing will be described later in detail with reference to FIG. 13. In step S1004 (an example of a condition determining step, an example of a relocation determining step), the optical system 402 determines whether or not the branch circuit correlated with the estimated device in step S1001 is the same branch circuit as the branch circuit correlated with the estimated device in the device information 600 saved in the device information storage unit 204 managed by the device management unit 102.

In a case where the branch circuit correlated with the estimated device in step S1001 is the same branch circuit as the branch circuit correlated with the estimated device in the device information 600 (YES in step S1004), the flow of FIG. 11 ends. On the other hand, in a case where the branch circuit correlated with the estimated device in step S1001 differs from the branch circuit correlated with the estimated device in the device information 600 (NO in step S1004), the flow advances to step S1005. In step S1005, the estimated device is conceived to have been relocated, so the device management unit 102 performs processing for confirmation of relocation. The details of this processing will be described later in detail with reference to FIG. 14.

Figure 12:
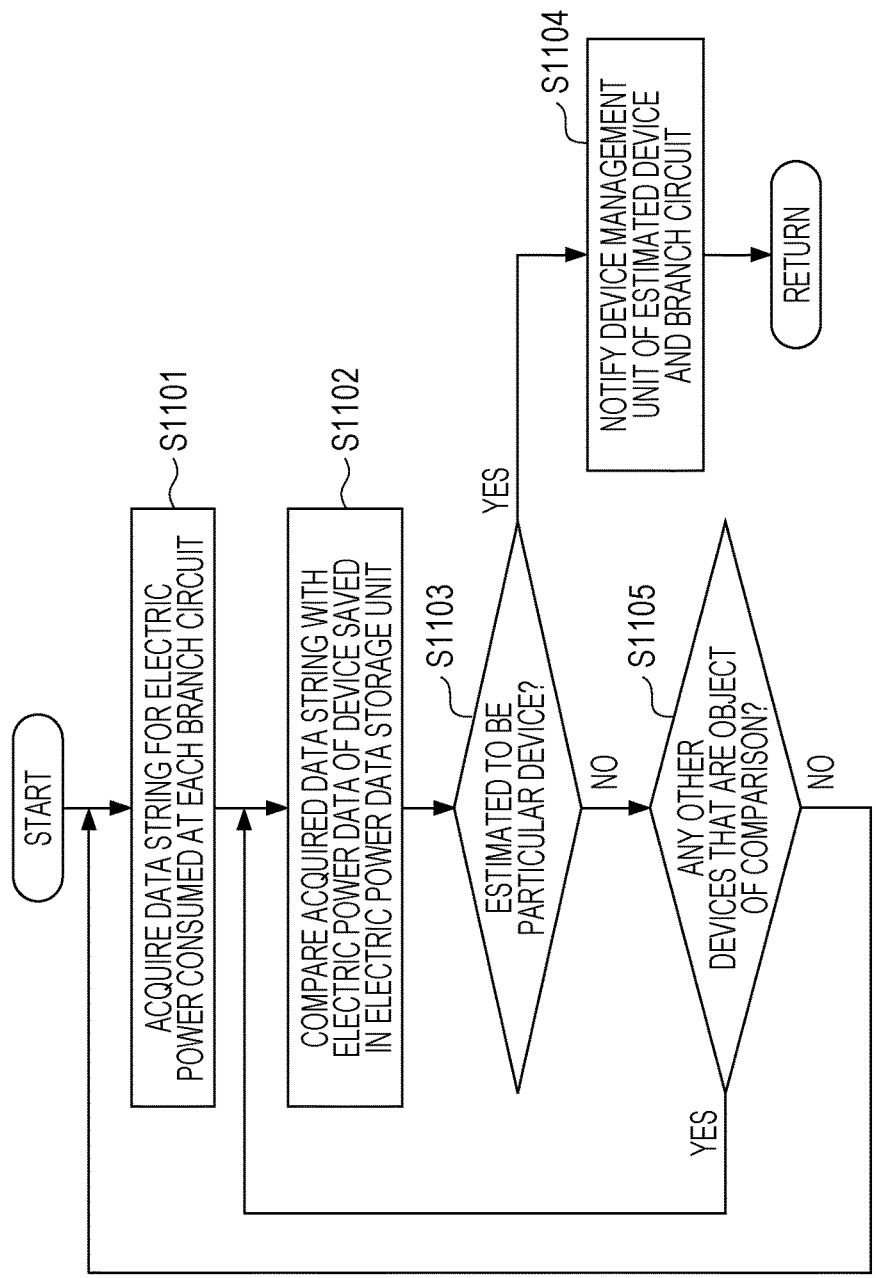
FIG. 12 is a diagram illustrating an operation flow of the correlation detecting unit according to the first embodiment.

FIG. 12 is a flowchart describing the processing performed by the correlation detecting unit 103 in step S1001 of FIG. 11 in further detail. First, in step S1101 (an example of an acquisition step), the data acquisition unit 301 of the correlation detecting unit 103 acquires a data string for electric power consumption per unit time (one minute in the present embodiment) for each branch circuit, from the electric power data management unit 104. This processing is performed on all branch circuits connected to the measuring unit 106. The data acquisition unit 301 also acquires a data string for a period backtracking from the execution clock time of step S1101 a predetermined period in time (20 minutes in the present embodiment). For example, if the execution clock time of step S1101 was 10:00, the data acquisition unit 301 acquires a data string for the period from 9:40 to 10:00.

Next, in step S1102 (an example of an estimating step), the estimating unit 302 compares the data string acquired in step S1101 and electric power data (the data string 903 in FIG. 9 or the electric power data 1000 in FIG. 10) saved in the electric power data storage unit 304.

The electric power consumption during operation of a device changes such as shown by the data string 903 in FIG. 9 or the electric power data 1000 in FIG. 10. Accordingly, the estimating unit 302 can estimate the device by comparing the data string 903 or the electric power data 1000 with the data string acquired in step S1101. Note that the estimated content here includes at least the type of device 602 (FIG. 6) of the device. The estimated content here may also include the model No. 603 (FIG. 6) of the device in the present embodiment.

Next, in step S1103, the estimating unit 302 determines whether or not the data string acquired in step S1101 is estimated to be a particular device, as the result of the comparison in step S1102. The estimating unit 302 performs wavelength matching between each data column 702 (FIG. 7) and electric power data 1000 by sequentially moving the column 702, for example, as illustrated in FIG. 10. The estimating unit 302 calculates the similarity of waveform between the column 702 and electric power data 1000, for example. In a case where the calculated similarity is a threshold value or above, the estimating unit 302 estimates the device in the data column 702 to be the device of the electric power data 1000. In a case where the data string acquired in step S1101 is estimated to be a particular device (YES in step S1103), the flow advances to step S1104, otherwise (NO in step S1103), the flow advances to step S1105.

In step S1105, the estimating unit 302 determines whether or not there is a device that is the object of comparison of electric power data (the data string 903 in FIG. 9 or the electric power data 1000 in FIG. 10) saved in the electric power data storage unit 304, that has not yet been compared. In a case where there is a device regarding which comparison has not yet been performed (YES in step S1105), the flow returns to step S1102 and comparison with electric power data of another device is performed. In a case where there are no devices regarding which comparison has not yet been performed (NO in step S1105), the flow returns to step S1101, and a new electric power consumption data string is acquired. Thus, the processing of FIG. 12 continues until determination of a particular device is made (YES in step S1103).

In step S1104, the estimating unit 302 hands the estimated device that has been estimated, and the branch circuit regarding which the electric power consumption used for estimation has been measure, to the notifying unit 303. The notifying unit 303 notifies the notification accepting unit 202 of the device management unit 102 of the estimated device and the branch circuit that has been handed thereto. The notification accepting unit 202 notifies the data management unit 201 of the estimated device and the branch circuit that has been notified thereto. Thereafter, the flow of step S12 ends, and advances to step S1102 in FIG. 11.

Note that the processing of step S1101 and step S1102 is repeatedly performed, as described above. Accordingly, the estimating unit 302 may perform the comparison processing in step S1102 using a data string obtained by linking the data string acquired in step S1101 immediately prior and a data string acquired in step S1101 earlier than that.

The electric power data 1000 illustrated in FIG. 10 may be a graph format representation of the data string 903 (FIG. 9) from starting operation to ending operation of the device, as described above. In this case, the time band of the electric power data 1000 differs depending on the device or operation. Accordingly, the estimating unit 302 may extract a data string to be used for comparison for each electric power data 1000, from the data string acquired in step S1101, so as to match the time band of the electric power data 1000.

Figure 13:
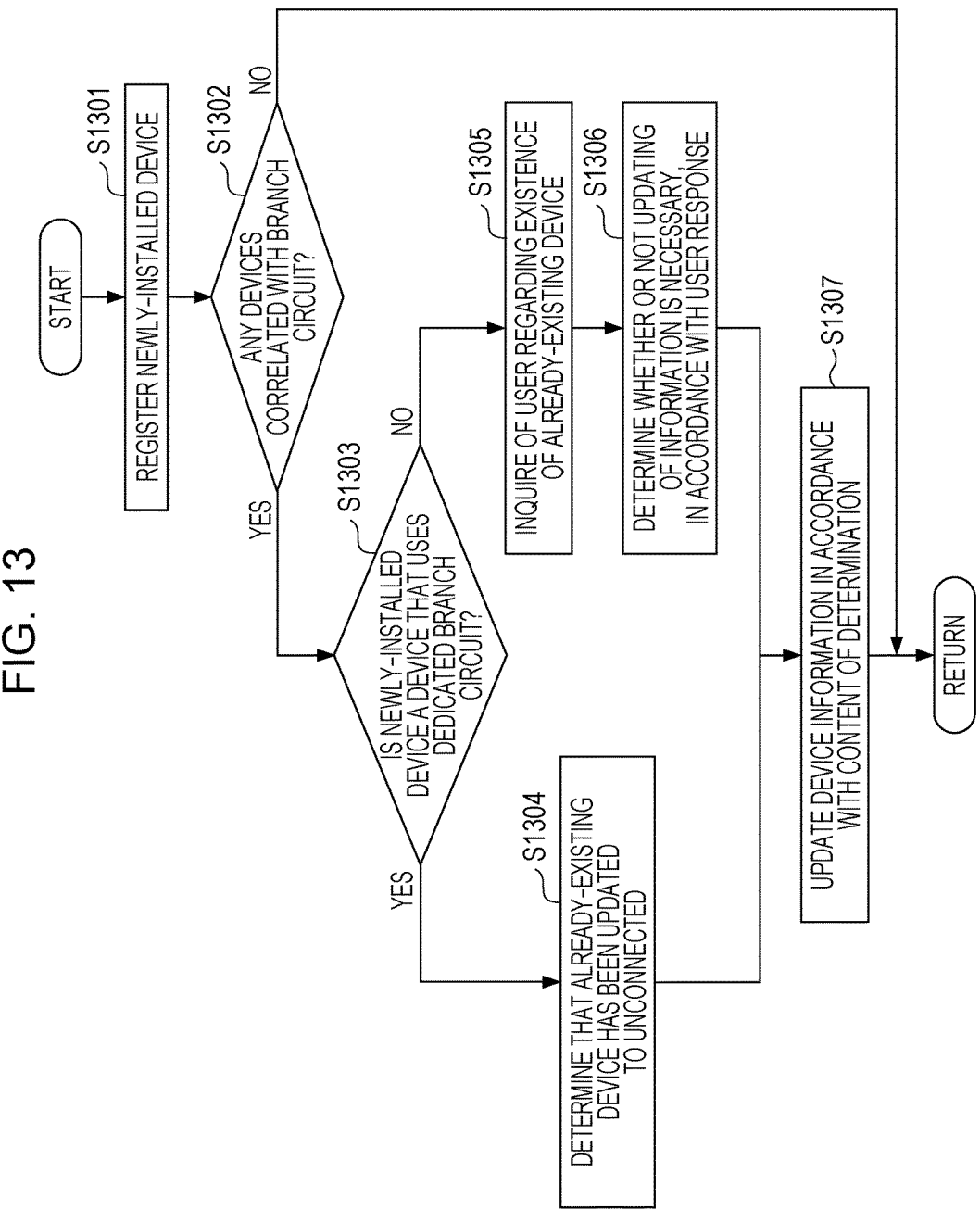
FIG. 13 is a diagram illustrating an operation flow of processing to newly install a device according to the first embodiment.

FIG. 13 is a flowchart illustrating details of newly-installed device processing in step S1003 in FIG. 11. First, in step S1301, the data management unit 201 of the device management unit 102 registers information of the device 108 that the notification accepting unit 202 has received from the correlation detecting unit 103 in the device information 600 in the device information storage unit 204. The data registered in the device information 600 includes the type of device 602 of the estimated device, and the branch No. 601 representing the branch circuit to which the estimated device is connected, as illustrated in FIG. 6.

Next, in step S1302 (an example of a condition determining step, an example of a first device determining step), the data management unit 201 searches the device information 600 saved in the device information storage unit 204, for whether or not a device correlated with the same branch circuit has already been registered therein. In a case where the device has not been registered (NO in step S1302), the newly-installed device having been registered (step S1301) ends the newly-installed device processing in FIG. 13. On the other hand, if the device has already been registered (YES in step S1302), the flow advances to step S1303. Hereinafter in the description of FIG. 13, this device that has already been registered will be referred to as "already-existing device".

In step S1303 (an example of a condition determining step, an example of a second device determining step), the determining unit 203 determines whether the newly-installed device registered in step S1301 is a device that uses the branch circuit as a dedicated branch circuit or as a shared branch circuit. A dedicated branch circuit is a branch circuit that the device uses independently. An air conditioner, a natural-refrigerant heat-pump water heater, and so forth, are examples of using a branch circuit independently, as described earlier. A shared branch circuit is a branch circuit which multiple devices use at the same time. Information regarding whether the device is a device that uses a dedicated branch circuit or a device that uses a shared branch circuit may be saved in the electric power data storage unit 304 beforehand.

In a case where the newly-installed device is a device that uses a dedicated branch circuit (YES in step S1303), the flow advances to step S1304. On the other hand, in a case where the newly-installed device is a device that uses a shared branch circuit (NO in step S1303), the flow advances to step S1305.

In step S1304 (an example of a condition determining step, an example of a third device determining step), the determining unit 203 determines that the already-existing device has been updated to an unconnected state. Since the estimated newly-installed device is a device that uses a dedicated branch circuit, it is conceived that there are no other devices connected. Accordingly, the determining unit 203 can determine that the previously-connected already-existing device has been replaced by the newly-installed device, without having to inquire of the user. Thereafter, the flow advances to step S1307.

In step S1305 (an example of a transmission step), the determining unit 203 commissions the user communication unit 105 to inquire of the user regarding the existence of the already-existing device. The reason is that the already-existing device is a device that uses a shared branch circuit with multiple devices, so it is difficult to determine whether or not the already-existing device continues to be connected.

Next, in step S1306 (an example of a condition determining step), the determining unit 203 follows the user response received from the user communication unit 105 and determines whether or not there is need to update the already-existing device. That is to say, if there has been a response from the user that the already-existing device continues to be connected, the determining unit 203 determines that there is no need for updating. On the other hand, if there has been a response from the user that the already-existing device has been removed, the determining unit 203 determines that the already-existing device has been updated to an unconnected state.

Next, in step S1307, the data management unit 201 follows the content of the determination that the determining unit 203 has made in step S1304 or step S1306, and updates the information of the already-existing device in the device information 600 saved in the device information storage unit 204. In a case where the determining unit 203 has determined that the already-existing device has been updated to an unconnected state, the data management unit 201 may delete the information of the already-existing device from the device information 600, or may leave the space in the branch No. 601 corresponding to the already-existing device blank in the device information 600 blank.

Figure 14:
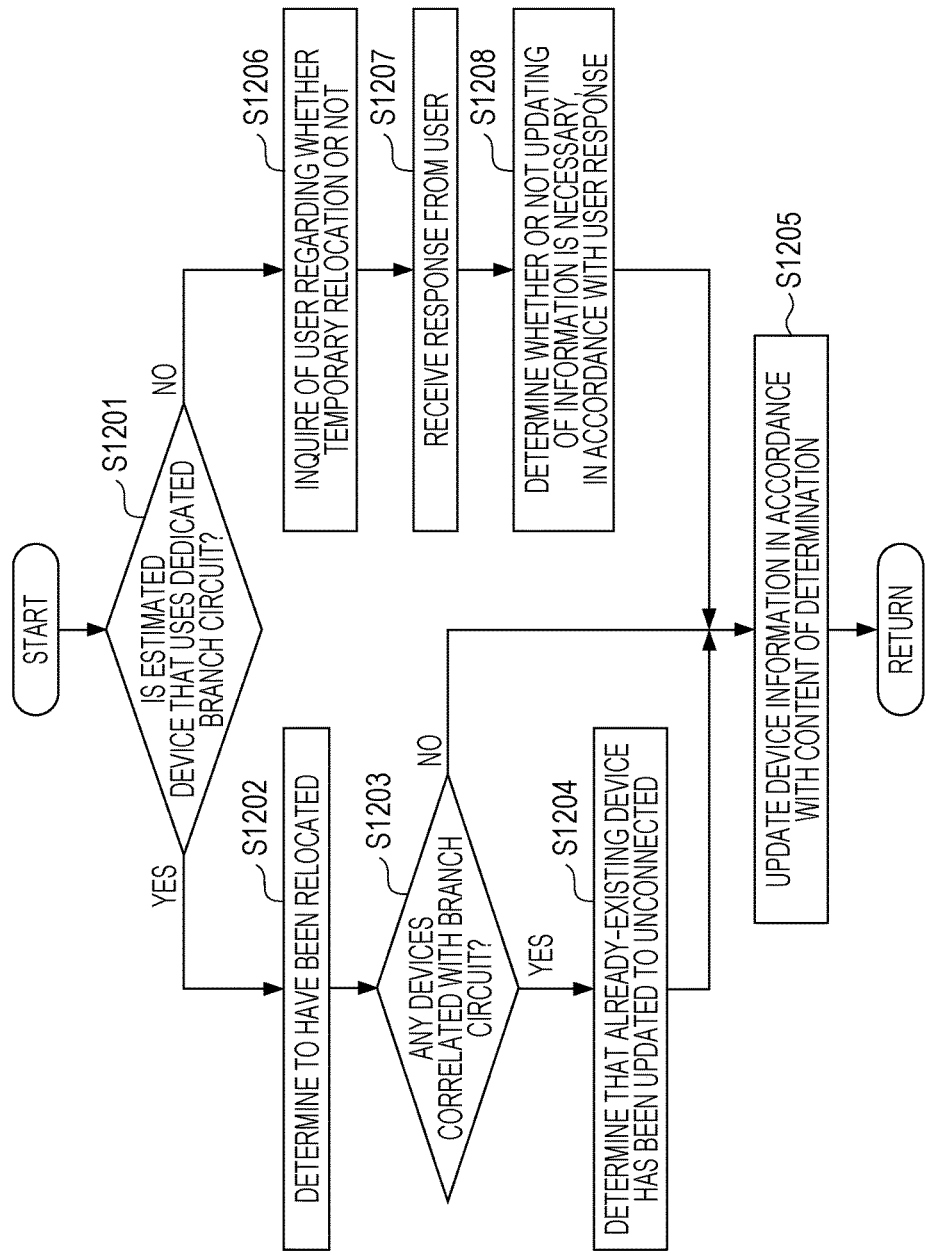
FIG. 14 is a diagram illustrating an operation flow of processing to confirm relocation according to the first embodiment.

FIG. 14 is a flowchart illustrating details of the processing for confirmation of relocation in step S1005 in FIG. 11. First, in step S1201 (an example of a condition determining step, an example of a device determining step), the determining unit 203 of the device management unit 102 determines whether or not the estimated device regarding which the notification accepting unit 202 received from the correlation detecting unit 103 in step S1104 in FIG. 12 (i.e., the estimated device estimated in step S1001 in FIG. 11) is a device that uses a dedicated branch circuit. In a case where determination is made that the estimated device is a device that uses a dedicated branch circuit (YES in step S1201), the flow advances to step S1202. On the other hand, in a case where determination is made that the estimated device is a device that uses a shared branch circuit (NO in step S1201), the flow advances to step S1206.

In step S1202, the determining unit 203 determines that the estimated device has been relocated from the previous dedicated branch circuit to the current dedicated branch circuit. The estimated device is a device that uses a dedicated branch circuit, so the determining unit 203 can determine that the estimated device has been relocated without inquiring of the user.

Next, in step S1203, the data management unit 201 searches the device information 600 saved in the device information storage unit 204, and checks whether or not the device correlated with the branch circuit that the notification accepting unit 202 has received from the correlation detecting unit 103 along with the estimated device has already been registered. In a case where the device has not been registered (NO in step S1203), the flow advances to step S1205. In a case where the device has already been registered (YES in step S1203), the flow advances to step S1204. Hereinafter in the description of FIG. 14, this device that has already been registered will be referred to as "already-existing device".

In step S1204, the determining unit 203 determines that the already-existing device has been updated to an unconnected state. Since the estimated device is a device that uses a dedicated branch circuit, it is conceived that there are no other devices connected. Accordingly, the determining unit 203 can determine that the previously-connected already-existing device has been replaced by the relocated estimated device, without having to inquire of the user.

In step S1206 (an example of a transmission step), the determining unit 203 commissions the user communication unit 105 to inquire of the user whether or not the estimated device is temporarily relocated. The estimated device is a device that uses a shared branch circuit, so it is unclear whether the user will return the estimated device to the original position after having temporarily moved the estimated device for some reason, or will continue to use the estimated device at the location to which it has been moved. Accordingly, the user communication unit 105 transmits inquiry information to inquire of the user regarding this point, to the user terminal 109.

Next, in step S1207, the user communication unit 105 receives the user response from the user terminal 109. The user communication unit 105 notifies the received user response to the determining unit 203.

Next, in step S1208, the determining unit 203 follows the user response received from the user communication unit 105 and determines whether or not there is need to update information of the estimated device. That is to say, in a case where a response has been received from the user that the movement is temporary, the determining unit 203 determines that updating of information of the estimated device is not performed. On the other hand, in a case of having received a response from the user that the estimated device will continue to be used at the location to which it has been moved, the determining unit 203 determines that the information thereof will be updated.

In step S1205, the data management unit 201 follows the content determined by the determining unit 203 in step S1202, step S1204, and step S1208, and updates the information of the estimated device and already-existing device in the device information 600 saved in the device information storage unit 204 as necessary. Step S1205 ends the flow of FIG. 14.

Figure 15:
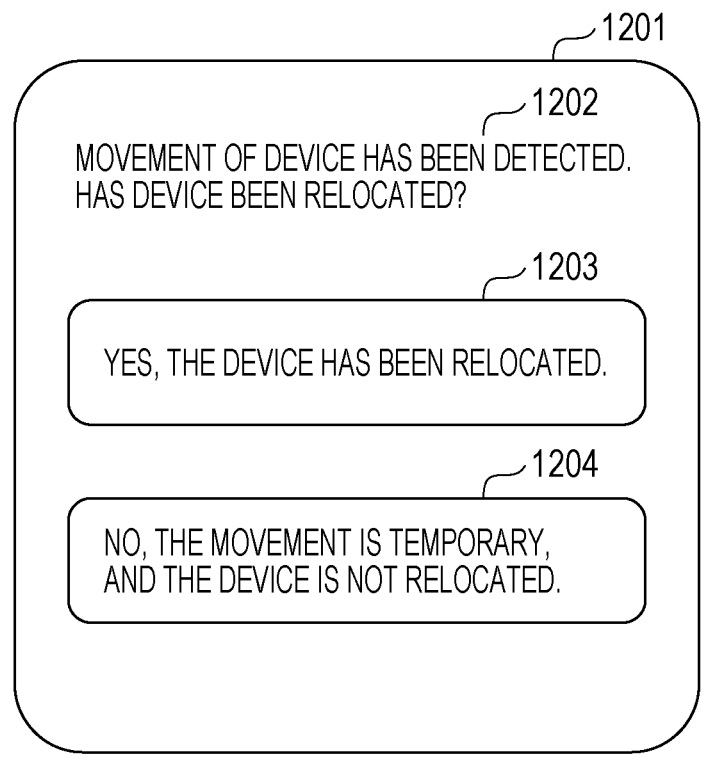
FIG. 15 is a diagram illustrating an example of a message for making confirmation with the user according to the first embodiment.

The following is a description of operations of the user communication unit 105, with reference to FIG. 15. The communication request processing unit 501 of the user communication unit 105 receives a notification to the user or a commission to make confirmation with the user, from the determining unit 203 of the device management unit 102. The communication request processing unit 501 that has received the commission communicates the content of the commission to the message generating unit 502. The message generating unit 502 notifies the user or generates a message for confirmation with the user, based on the content of the commission.

The message generating unit 502 hands the generated message to the communication unit 503. The communication unit 503 transmits the message handed over from the message generating unit 502 to the user terminal 109. The user terminal 109 displays the content including the message transmitted from the communication unit 503 on a display screen.

The user communication unit 105 may manage the information of the user terminal 109 relating to the transmission destination. Note that information of the user terminal 109 relating to the transmission destination may be managed by the device management unit 102 in correlation with the device. In this case, it is sufficient for the device management unit 102 to hand information of the user terminal 109 relating to the transmission destination to the user communication unit 105, at the time of notification or commissioning of confirmation to the user.

FIG. 15 is a diagram illustrating an example of a display screen 1201 of the user terminal 109. An example of a message 1202 inquiring of the user that is used in step S1206 in FIG. 14, is displayed at the top of the display screen 1201.

FIG. 15 shows that the message 1202 "MOVEMENT OF DEVICE HAS BEEN DETECTED. HAS DEVICE BEEN RELOCATED?", generated by the message generating unit 502 is displayed. Response buttons 1203 and 1204 are displayed below in the display screen 1201. Response button 1203 displays the text "YES, THE DEVICE HAS BEEN RELOCATED.". Response button 1204 displays the text "NO, THE MOVEMENT IS TEMPORARY, AND THE DEVICE IS NOT RELOCATED.".

The user selects one of the response buttons 1203 and 1204, and presses the selected response button. The user terminal 109 in the present embodiment is a device having a touch panel, such as a smartphone or a tablet or the like.

In a case of only notifying the user, the communication unit 503 notifies the response interpreting unit 504 that the transmission is complete. The response interpreting unit 504 notifies the communication request processing unit 501 that the transmission is complete. The communication request processing unit 501 notifies the determining unit 203 of the device management unit 102 that notification of the user has been completed, and the processing ends.

In a case of requesting confirmation of the user, the communication unit 503 receives the response from the user terminal 109. In the case of the display screen 1201 displayed in FIG. 15 for example, the user presses the response button 1203 or response button 1204 upon which a message corresponding to the response button is transmitted from the user terminal 109 to the communication unit 503.

In a case of the user pressing the response button 1203, the user terminal 109 uses the Hyper Text Transfer Protocol (HTTP) POST method, for example, to transmit a message indicating that the device has been relocated, to a Uniform Resource Locator (URL) corresponding to the communication unit 503. In a case of the user pressing the response button 1204, the user terminal 109 uses the HTTP POST method, for example, to transmit a message indicating that the device has been temporarily moved, to a URL corresponding to the communication unit 503.

The communication unit 503 hands the response message received from the user terminal 109 to the response interpreting unit 504. The response interpreting unit 504 interprets the content of the response message, and extracts the content of the user response. The response interpreting unit 504 hands the extracted content of the response from the user to the communication request processing unit 501. The communication request processing unit 501 hands the received content of the response from the user to the determining unit 203 of the device management unit 102, and the processing ends.

Thus, according to the device information management system 101 of the first embodiment described above, notification to the user, or making confirmation with the user, can be performed only when necessary, in accordance with information of the device 108. This is advantageous in that ease of use for the user is improved.

The first embodiment also is advantageous in that whether or not there is need to make confirmation with the user is appropriately judged in accordance with the type of estimated device estimated by the estimating unit 302 of the correlation detecting unit 103 (regarding whether or not a device using a dedicated branch circuit, for example), improving ease of use for the user.

The measuring unit 106 may further transmit voltage information of the branch circuit 107 to the device information management system 101. The device management unit 102 of the device information management system 101 may further manage voltage information of the branch circuit 107. The determining unit 203 of the device management unit 102 may first determine whether or not the branch circuit 107 is a dedicated branch circuit, according to voltage information of the branch circuit 107 to which the estimated device has been connected, in step S1303 (FIG. 13) and step S1201 (FIG. 14). The determining unit 203 may be of a configuration to perform the above-described determination in a case where determination could not be made whether the branch circuit 107 is a dedicated branch circuit or not from the voltage information of the branch circuit 107.

In many countries, homes are provided with branch circuits having different voltages for different purposes. For example, in Japan, normal devices use a power source of 100 V voltage, but there are some devices that have large electric power consumption, such as air conditioners, natural-refrigerant heat-pump water heaters, and so forth, that use 200 V voltage. The latter use dedicated branch circuits. Accordingly, the determining unit 203 can determine whether or not a branch circuit is a dedicated branch circuit, by voltage information of the branch circuit 107.

According to this configuration, notification to the user, or making confirmation with the user, can be performed only when necessary, in accordance with voltage information of the branch circuit 107. This is advantageous in that ease of use for the user is improved.

Also, in the newly-installed device processing in step S1003 (FIG. 11), in a case where the newly-installed device is a device that uses a shared branch circuit (NO in step S1303 in FIG. 13) and an already-existing device exists (YES in step S1302 in FIG. 13), the configuration is not restricted to performing the above-described user inquiry (step S1305 in FIG. 13) straightaway. A configuration may be made where the existence of the already-existing device is confirmed by interpreting change in electric power consumption before user confirmation, in the same way as the processing by the correlation detecting unit 103.

Also, in a case of having received a response from the user that the movement is temporary in step S1207, the determining unit 203 determines in step S1208 that updating of information of the estimated device is not performed, but this is not restrictive. For example, in step S1208 the determining unit 203 may temporarily suspend the updating. In a case of detecting correlation of the estimated device with the same branch circuit again, or a predetermined number of times, the determining unit 203 may determine to update the device information 600.

Second Embodiment

The following is a description of a second embodiment of the device information management system according to the present disclosure. Only portions which differ from the first embodiment will be described in the second embodiment.

The device information 600 managed by the device management unit 102 includes the date detected 605, as shown in FIG. 6. The date detected 605 represents, of dates that the device connected to the branch circuit corresponding to the branch No. 601 have been estimated by the estimating unit 302 of the correlation detecting unit 103, the date closest to the current point-in-time.

Upon being notified by the notification accepting unit 202 regarding the estimated device and branch circuit in step S1104 in FIG. 12, the data management unit 201 stores the date thereof. In the newly-established device processing in step S1003, the processing for confirmation of relocation in step S1005, and the period confirmation processing in step S1009, in FIG. 16 which will be described later, the data management unit 201 saves the device information 600 including the date thereof, in the device information storage unit 204.

Figure 16:
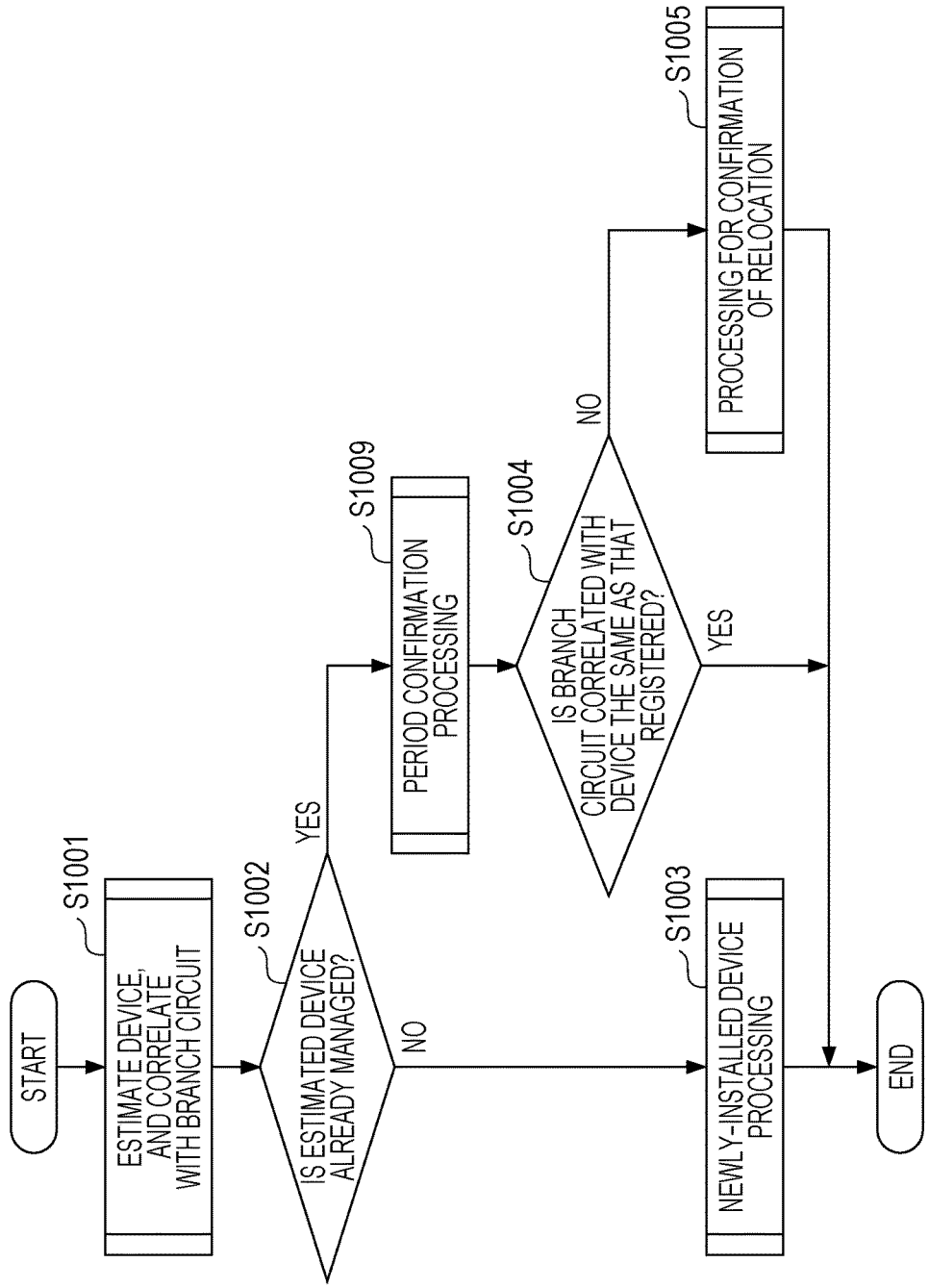
FIG. 16 is a diagram illustrating an operation flow of a device information management system according to a second embodiment.

FIG. 16 is a flowchart schematically illustrating processing of the device information management system 101 in the second embodiment. The flowchart in FIG. 16 differs from the flowchart in the first embodiment illustrated in FIG. 11 with regard to the point that period confirmation processing in step S1009 is performed before step S1004 in a case where the estimated device is a device that already is managed (YES in step S1002).

Figure 17:
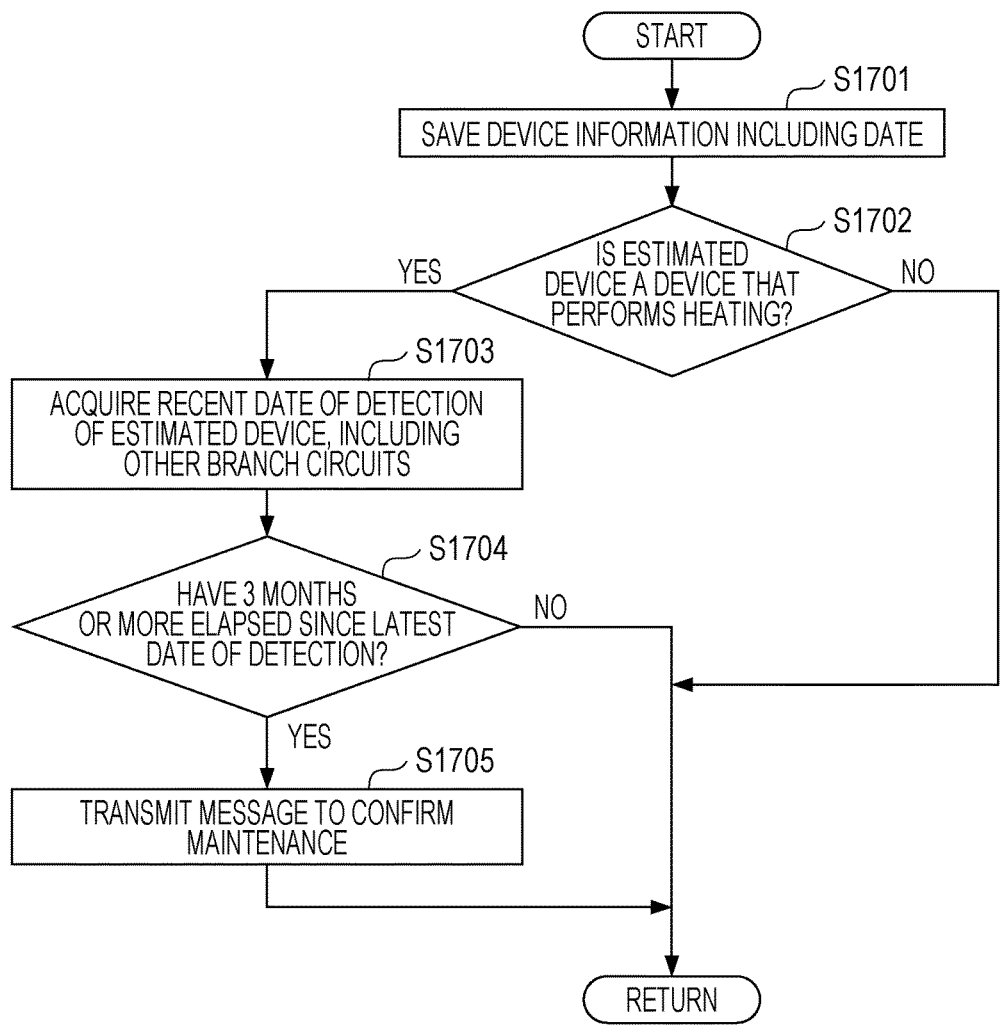
FIG. 17 is a diagram illustrating an operation flow of processing for period confirmation according to a second embodiment.

FIG. 17 is a flowchart illustrating the details of period confirmation processing in S1009 in FIG. 16. In step S1701, the data management unit 201 saves the device information 600 in the device information storage unit 204, including the date when the estimated device and branch circuit were notified from the notification accepting unit 202 in step S1104 in FIG. 12.

Next in step S1702, the data management unit 201 determines whether the estimated device is a device that performs heating or not. In a case where the estimated device is a device that performs heating (YES in step S1702), the flow advances to step S1703. In a case where the estimated device is not a device that performs heating (NO in step S1702), the period confirmation processing in FIG. 17 ends, since the present embodiment only performs period confirmation regarding devices that perform heating.

In step S1703, the data management unit 201 references the device information 600 saved in the device information storage unit 204, and acquires the date detected 605 closest to the current date, including other branch circuits that are different from the current branch circuit. The data management unit 201 notifies the date detected 605 of the estimated device that has been acquired, to the determining unit 203.

Next, in step S1704 (an example of a condition determining step), the determining unit 203 compares the current date with the notified date detected 605, and determines whether or not three months or more have elapsed from the date detected 605 to the current date. If three months or more have elapsed (YES in step S1704), the determining unit 203 determines that there is need to transmit a message, and the flow advances to step S1705. On the other hand, if three months or more have not elapsed (NO in step S1704), the period confirmation processing in FIG. 17 ends.

Next, in step S1705 (an example of a transmission step), the determining unit 203 requests the communication request processing unit 501 of the user communication unit 105 to transmit a message. The user communication unit 105 transmits the user terminal 109 a message by processing the similar to that performed in the first embodiment, as described with reference to FIG. 15. Thereafter, the processing in FIG. 17 ends.

Figure 18:
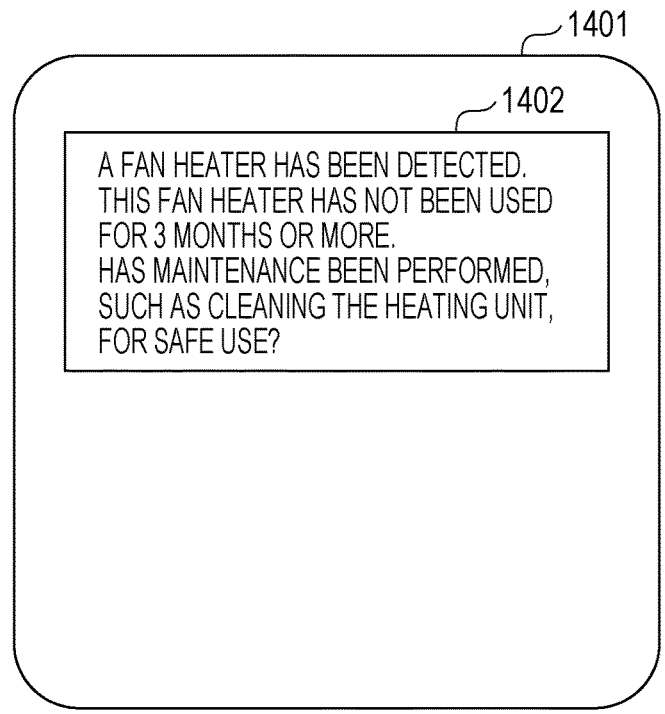
FIG. 18 is a diagram illustrating an example of a message for notifying the user according to the second embodiment.

FIG. 18 is a diagram illustrating an example of a display screen 1401 of the user terminal 109 where the message transmitted in step S1705 in FIG. 17 has been displayed. The user terminal 109 displays the message 1402 "A FAN HEATER HAS BEEN DETECTED. THIS FAN HEATER HAS NOT BEEN USED FOR 3 MONTHS OR MORE.

HAS MAINTENANCE BEEN PERFORMED, SUCH AS CLEANING THE HEATING UNIT, FOR SAFE USE?" on the display screen 1401. Thus, in the example in FIG. 18, a message promoting maintenance for safe use is displayed.

Thus, estimated device estimated by the estimating unit 302 of the correlation detecting unit 103 has been determined to not have been used for a predetermined period (three months in the present embodiment). Accordingly, in the case that the estimated device is a heating device, a message promoting maintenance for safe use is transmitted to the user terminal 109 in the second embodiment. This is advantageous in that ease of use by the user is improved.

Although the second embodiment has a message transmitted in a case where a heating device has not been used for three months or more, but the device is not restricted to a heating device, and the predetermined period is not restricted to three months. For example, in a case where an air conditioner has not been used for five months or more, the device information management system 101 may transmit a message to the user terminal 109 recommending maintenance such as mold removal and deodorizing. Alternatively, in a case where any of the devices has not been used for a month or more, the device information management system 101 may transmit a message to the user terminal 109, prompting an inspection regarding whether dust has collected around the power outlet.

Further, the device management unit 102 may manage periods for which devices are consecutively estimated. The user communication unit 105 may be of a configuration where, in a case where this period exceeds a threshold value that has been decided beforehand, a message is transmitted to the user terminal 109. In this case, the device information 600 managed by the device management unit 102 includes the date detected 605, previous date detected 606, and number of consecutively-detected days 607, as illustrated in FIG. 6. The previous date detected 606 represents the last date that the device was estimated before the date detected 605. The number of consecutively-detected days 607 represents the number of days that the device has been continuously estimated. When the date detected 605 and the previous date detected 606 are consecutive, the data management unit 201 of the device management unit 102 increments the number of consecutively-detected days 607 by 1.

Figure 19:
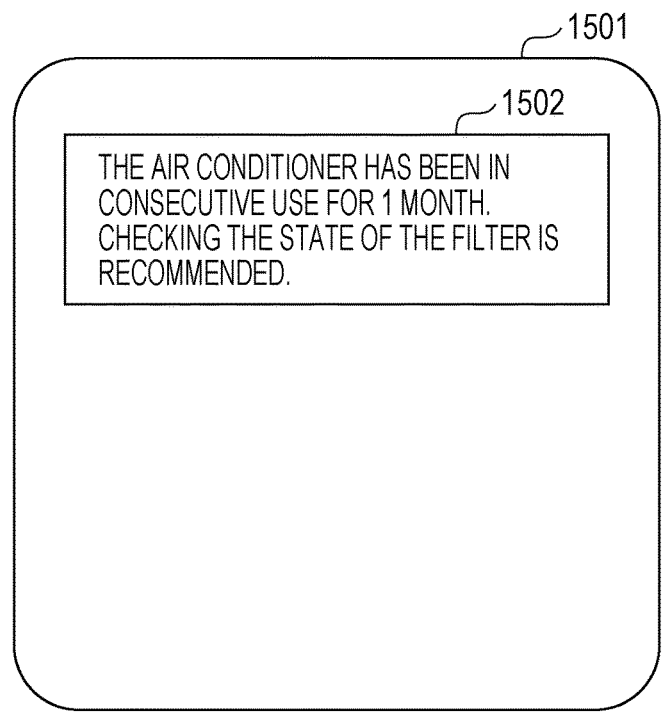
FIG. 19 is a diagram illustrating an example of a message for notifying the user according to the second embodiment.

FIG. 19 is a diagram illustrating an example of a display screen 1501 of the user terminal 109 displaying a different message from FIG. 18. The user terminal 109 displays the message 1502 "THE AIR CONDITIONER HAS BEEN IN CONSECUTIVE USE FOR 1 MONTH. CHECKING THE STATE OF THE FILTER IS RECOMMENDED." on the display screen 1501.

In the embodiment illustrated in FIG. 19, when the estimating unit 302 of the correlation detecting unit 103 estimates the air conditioner every day, the data management unit 201 of the device management unit 102 updates the number of consecutively-detected days 607 of the air conditioner in the device information 600. The determining unit 203 of the device management unit 102 determines whether the number of consecutively-detected days 607 of the air conditioner is at a threshold value (one month in FIG. 19) or more. If the number of consecutively-detected days 607 of the air conditioner is one month or more, the determining unit 203 commissions the user communication unit 105 to transmit a message. The user communication unit 105 transmits a message to inspect the filter, such as illustrated in FIG. 19. Determination of this "consecutive" by the determining unit 203 may be a configuration where it is deemed to be "consecutive" only in a case where estimated days are consecutive, or may be a configuration where it is deemed to be "consecutive" if a missing period therein is within a particular period such as one day, even if not consecutive.

Although a message is transmitted in the embodiment illustrated in FIG. 19 when the air conditioner is in consecutive use for one month or longer, the device is not restricted to an air conditioner, and the predetermined period is not restricted to one month. In a case where an air purifier has been in consecutive use for one month or longer, the device information management system 101 may transmit a message to the user terminal 109 prompting cleaning of the filter. Alternatively, in a case where any of the devices has been consecutively used for a month or more, the device information management system 101 may transmit a message to the user terminal 109, prompting an inspection regarding whether dust has collected around the power outlet.

Third Embodiment

Figure 20:
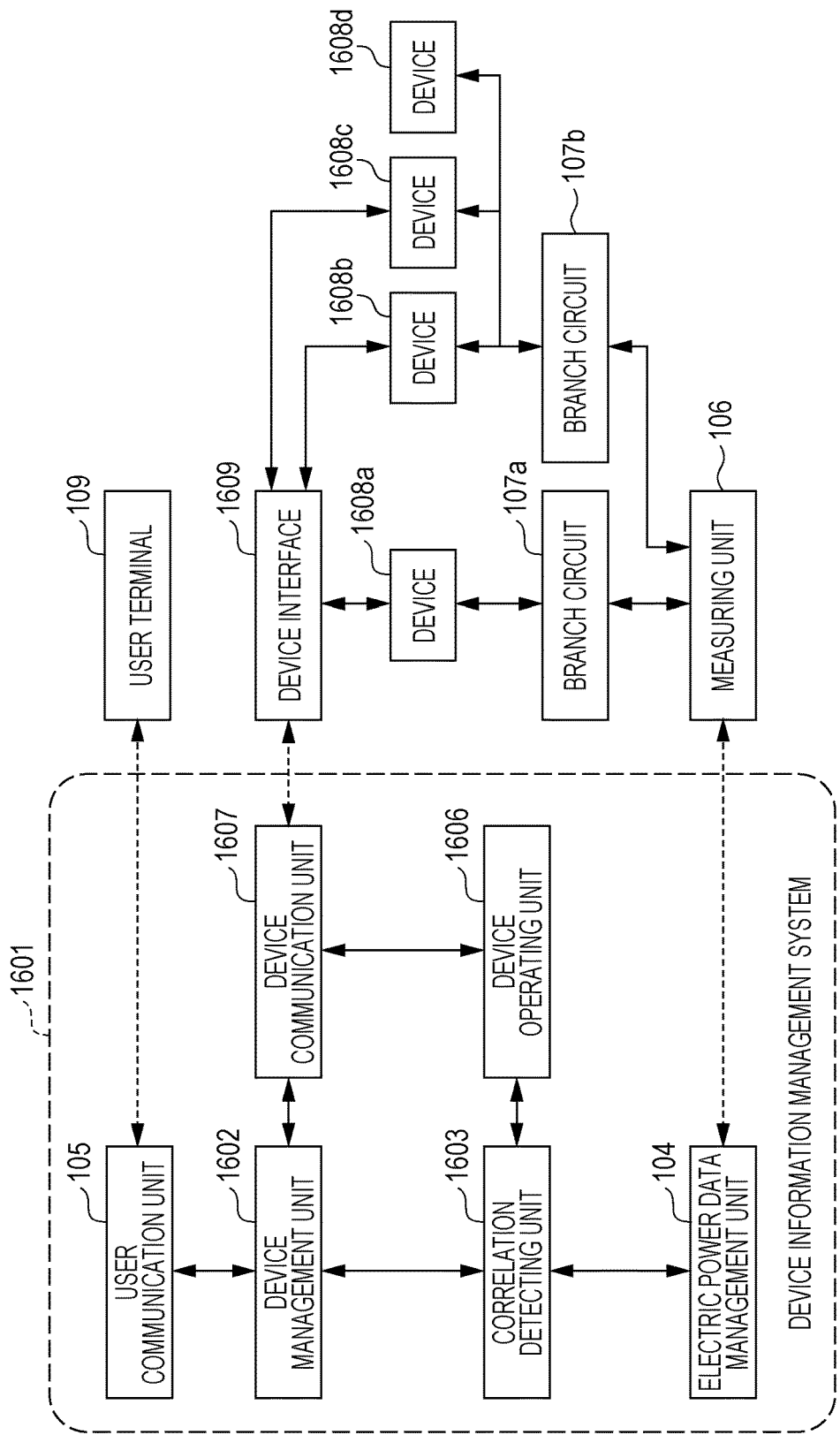
FIG. 20 is a block diagram illustrating an example of the configuration of a device information management system according to a third embodiment.

The following is a description of a third embodiment of a device information management system according to the present disclosure. FIG. 20 is a block diagram schematically illustrating the configuration of the device information management system according to the third embodiment of the present disclosure. In FIG. 20, a device information management system 1601 includes a device management unit 1602, a correlation detecting unit 1603, the electric power data management unit 104, the user communication unit 105, a device operating unit 1606, and a device communication unit 1607. The device information management system 1601 includes a CPU and memory, for example. Note that the device information management system 1601 is not restricted to a CPU, and may include other hardware.

A device 1608*a* is a device that independently uses a branch circuit 107*a* (an example of a dedicated branch circuit), such as an air conditioner, a natural-refrigerant heat-pump water heater, or the like. Devices 1608*b*, 1608*c*, and 1608*d* are devices that collectively use a branch circuit 107*b* (an example of a shared branch circuit), such as a washing machine, microwave oven, television, and so forth.

A device interface 1609 is connected to the devices 1608*a*, 1608*b*, and 1608*c*, and performs communication with the device information management system 1601. Note that the device 1608*d* is not connected to the device interface 1609. In the following description, when the devices 1608*a*, 1608*b*, 1608*c*, and 1608*d* are not distinguished, they will be collectively referred to as "device 1608".

The electric power data management unit 104, user communication unit 105, branch circuits 107, measuring unit 106, and user terminal 109, are the same as those in the first embodiment illustrated in FIG. 1, and accordingly are denoted by the same reference numerals. Hereinafter detailed description of these will be omitted.

The device 1608 is configured to interpret a message received from the device interface 1609, and act accordingly. The device 1608 also returns a response to the received message to the device interface 1609. The box device 1608 returns states as a response, such as whether starting the operation has succeeded or starting the operation has failed. Alternatively, the device 1608 may return a response to the effect that the message has been received. The device 1608 may have a function of notifying the device information management system 1601 of any change that has occurred in the state, such as starting of operation or stopping of operation, via the device interface 1609. This sort of device 1608 that notifies operations or changes in state in accordance with messages can be realized by technology such as ECHONET Lite and Universal Plug and Play (UPnP). Further, the device 1608 may have a function of returning device information such as the model No. of the device 1608 and unique device ID identifying the device 1608, operating status of the device, state of the device, and like detailed information, following a request received via the device interface 1609.

The device interface 1609 performs communication with the device information management system 1601. The device interface 1609 hands the message received from the device information management system 1601 to the device 1608. The device interface 1609 transmits a message received from the device 1608 to the device information management system 1601. Note that the device interface 1609 may be configured as part of the device 1608.

Figure 21:
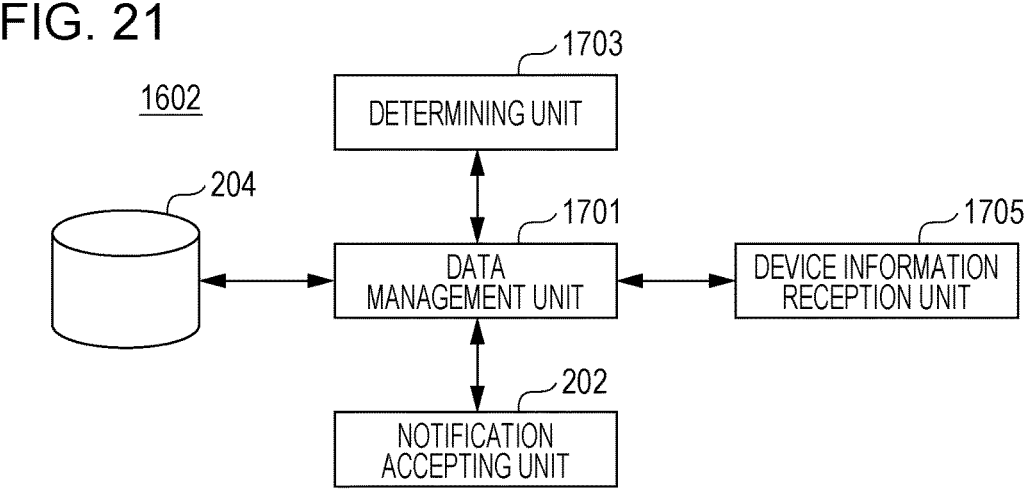
FIG. 21 is a block diagram illustrating an example of the configuration of a device management unit according to the third embodiment.

FIG. 21 is a block diagram schematically illustrating the configuration of the device management unit 1602. The device management unit 1602 includes a data management unit 1701, the notification accepting unit 202, a determining unit 1703, the device information storage unit 204, and a device information reception unit 1705.

The data management unit 1701 manages device information 600 (FIG. 6) saved in the device information storage unit 204. The data management unit 1701 creates new device information 600 and saves in the device information storage unit 204, or updates the device information 600 saved in the device information storage unit 204, based on information received from the notification accepting unit 202, determination contents received from the determining unit 1703, and information received from the device information reception unit 1705.

The determining unit 1703 performs determination under request by the data management unit 1701, the processing of which will be described later. The device information reception unit 1705 receives the state of the device 1608 acquired by the device communication unit 1607 by communication. The device information reception unit 1705 hands the received state of the device 1608 over to the data management unit 1701.

Figure 22:
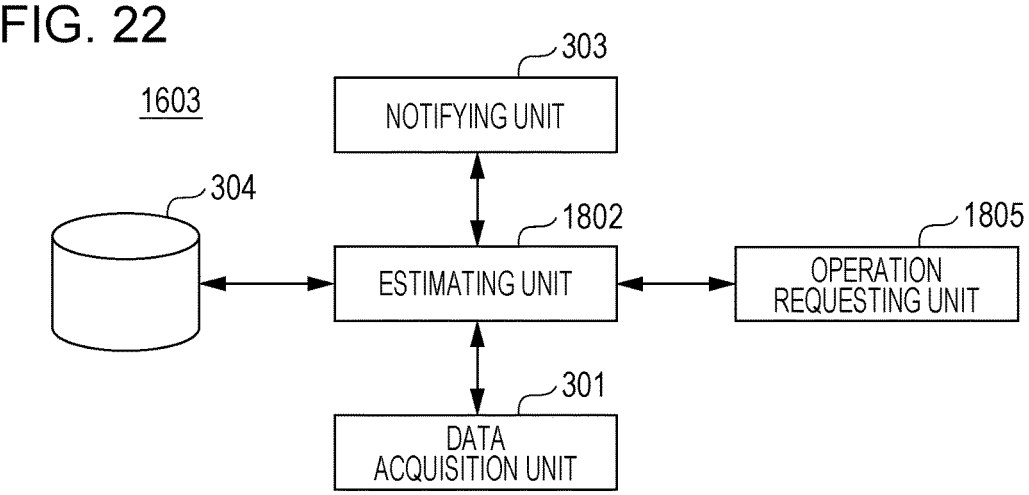
FIG. 22 is a block diagram illustrating an example of the configuration of a correlation detecting unit according to the third embodiment.

FIG. 22 is a block diagram schematically illustrating the configuration of the correlation detecting unit 1603. The correlation detecting unit 1603 includes the data acquisition unit 301, an estimating unit 1802, the notifying unit 303, the electric power data storage unit 304, and an operation request unit 1805. Of these, the data acquisition unit 301, notifying unit 303, and electric power data storage unit 304 are the same as the data acquisition unit 301, notifying unit 303, and electric power data storage unit 304 in the first embodiment described above in FIG. 3, and accordingly are denoted by the same reference numerals. Hereinafter detailed description of these will be omitted.

The estimating unit 1802 transmits an operation request to the device 1608 via the operation request unit 1805. The estimating unit 1802 receives whether or not the operation was successful from the operation request unit 1805. The estimating unit 1802 also uses the data acquisition unit 301 to acquire a data string for electric power consumption per unit time for each branch circuit, in time bands before and after, including the requested operation of the device 1608. The estimating unit 1802 compares the electric power data observed by the requested operation, that is saved in the electric power data storage unit 304, with the acquired data string. Based on the comparison results, the estimating unit 1802 estimates the branch circuit to which the device 1608 regarding which the operation was requested is connected. In a case where estimation of the branch circuit was successful, the estimating unit 1802 hands the device regarding which the operation was requested and the estimated branch circuit to the notifying unit 303.

The electric power data storage unit 304 has saved therein the data string 903 for electric power consumption per unit time for each type of device 801 of the device and each operation/action 803, observed by the operation/action thereof, which has been described with reference to FIGS. 8 and 9. Hereinafter, this data string of electric power consumption will also be referred to as electric power data.

Under request by the estimating unit 1802, the operation request unit 1805 commissions the device operating unit 1606 to operate the device 1608. The operation request unit 1805 receives the results of operation from the device operating unit 1606. The operation request unit 1805 hands the received operation results to the estimating unit 1802.

Figure 23:
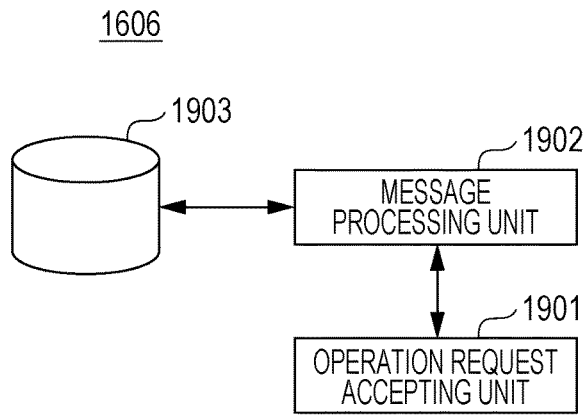
FIG. 23 is a block diagram illustrating an example of the configuration of a device operating unit according to the third embodiment.

FIG. 23 is a block diagram schematically illustrating the configuration of the device operating unit 1606. The device operating unit 1606 includes an operation request accepting unit 1901, a message processing unit 1902, and an operation information storage unit 1903.

The operation request accepting unit 1901 accepts operation requests as to the device 1608 from the correlation detecting unit 1603. The operation request accepting unit 1901 hands the accepted operation requests to the message processing unit 1902. The operation request accepting unit 1901 receives a message regarding whether the processing was successful or not, based on the operation request, from the message processing unit 1902. The operation request accepting unit 1901 hands the received information regarding whether the processing was successful or not, to the correlation detecting unit 1603.

When an operation request for the device 1608 is handed from the operation request accepting unit 1901, the message processing unit 1902 generates a command message to be transmitted to the device 1608 by referencing information saved in the operation information storage unit 1903. The message processing unit 1902 hands the generated command message to the device communication unit 1607. Upon accepting a return message as to the command message transmitted from the device communication unit 1607, the message processing unit 1902 further interprets the accepted return message by referencing information saved in the operation information storage unit 1903. The message processing unit 1902 hands the content of the return message that has been interpreted to the operation request accepting unit 1901.

The operation information storage unit 1903 saves the format or standard of the operation command corresponding to the type of device 1608. The operation information storage unit 1903 typically is configured using nonvolatile memory, such as a hard disk drive, flash memory, or the like.

As for the technique to realize the operation of the device 1608, ECHONET Lite or UPnP or the like is used in the present embodiment. The operation information storage unit 1903 has stored therein information that the message processing unit 1902 can use, such as the type of technique to operate the device 1608, the message format of the technique, vocabulary, and so forth, for the technique.

The message processing unit 1902 follows information saved in the operation information storage unit 1903 to generate command messages for operation and interpretation of return messages. For example, in a case where the device 1608 uses ECHONET Lite, the message processing unit 1902 generates and interprets ECHONET Lite messages. In a case where the device 1608 uses UPnP, the message processing unit 1902 generates and interprets messages following UPnP.

Figure 24:
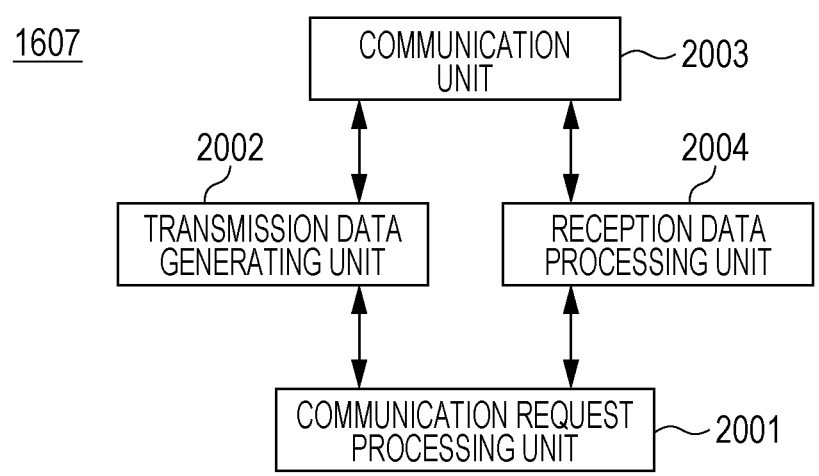
FIG. 24 is a block diagram illustrating an example of the configuration of a device communication unit according to the third embodiment.

FIG. 24 is a block diagram schematically illustrating the configuration of the device communication unit 1607. The device communication unit 1607 includes a communication request processing unit 2001, a transmission data generating unit 2002, a communication unit 2003, and a reception data processing unit 2004.

The communication request processing unit 2001 hands a message to be transmitted to the transmission data generating unit 2002 under request from the device operating unit 1606. The communication request processing unit 2001 receives from the reception data processing unit 2004 a message received in accordance with the request from the device operating unit 1606. The communication request processing unit 2001 hands the received message to the device operating unit 1606. The communication request processing unit 2001 hands a message to be transmitted to the transmission data generating unit 2002 under request from the device management unit 1602. The communication request processing unit 2001 receives from the reception data processing unit 2004 a message received in accordance with the request from the device management unit 1602. The communication request processing unit 2001 hands the received message to the device management unit 1602.

The transmission data generating unit 2002 uses the message received from the communication request processing unit 2001 to generate transmission data. ECHONET Lite, for example, is used in the present embodiment, and an ECHONET Lite message is transmitted to the device 1608 using the HTTP POST method. In this case, the transmission data generating unit 2002 generates an HTTP POST request message including the ECHONET Lite message in the body thereof.

The communication unit 2003 transmits to the device interface 1609 transmission data that the transmission data generating unit 2002 has generated by communicating with the device interface 1609. The communication unit 2003 receives a response transmitted from the device interface 1609. The communication unit 2003 hands the received response to the reception data processing unit 2004.

The communication unit 2003 uses ECHONET Lite, for example, in the present embodiment, and communication is made with the device 1608 by the HTTP POST method using ECHONET Lite messages. In this case, the communication unit 2003 transmits an HTTP POST request message generated by the transmission data generating unit 2002 to a URL that the device interface 1609 receives, over an IP network. The communication unit 2003 receives a response message transmitted via the device interface 1609. The communication unit 2003 hands the received response message to the reception data processing unit 2004.

The reception data processing unit 2004 extracts the response message of the device 1608 from the response message that the communication unit 2003 has received. The reception data processing unit 2004 hands the extracted response message to the communication request processing unit 2001. As described above, the communication unit 2003 uses ECHONET Lite in the present embodiment, for example, and communication is made with the device 1608 by the HTTP POST method using ECHONET Lite messages. In this case, the reception data processing unit 2004 extracts an ECHONET Lite message from the body of the received HTTP POST response message. The reception data processing unit 2004 hands the extracted ECHONET Lite message to the communication request processing unit 2001.

Figure 25:
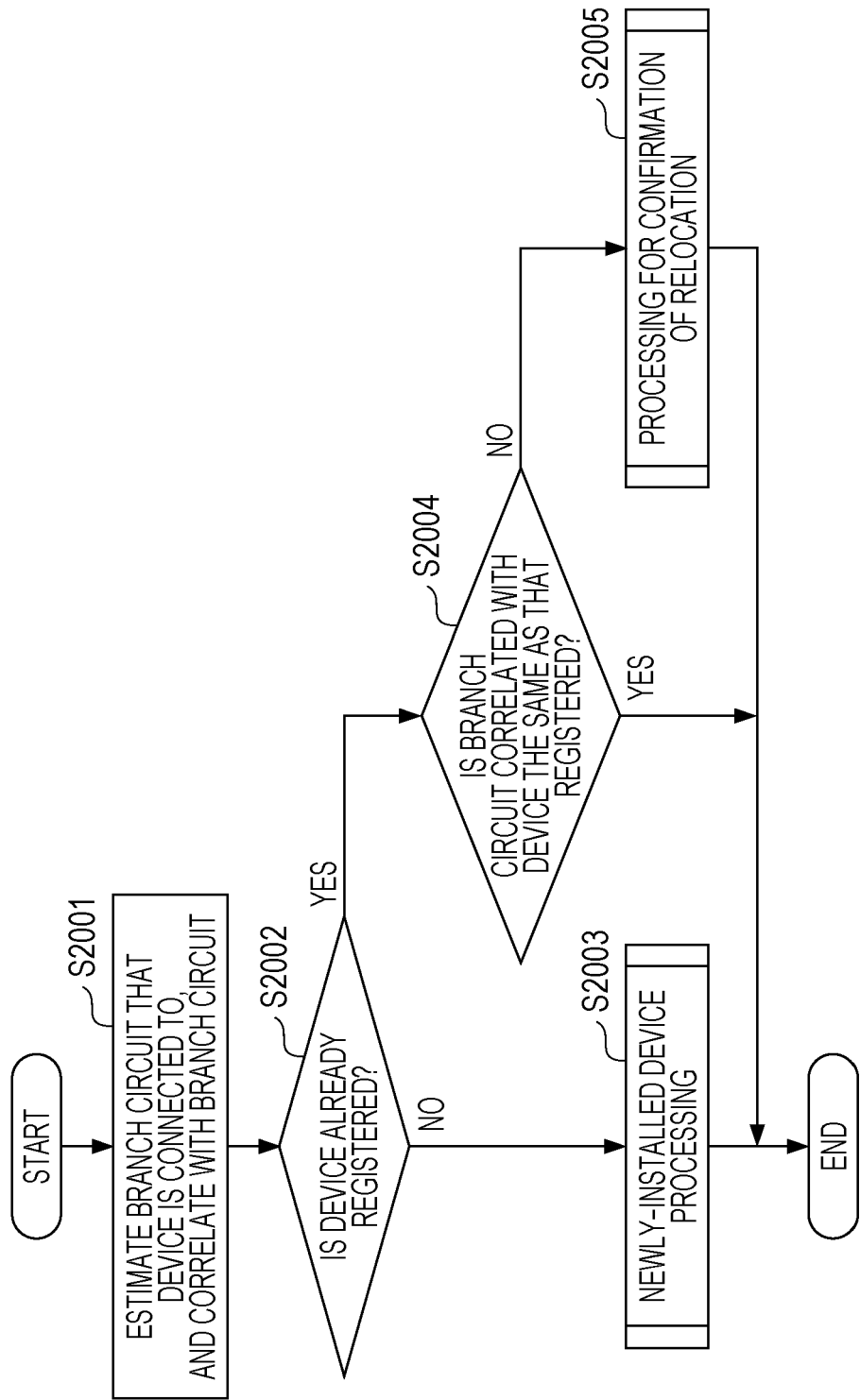
FIG. 25 is a diagram illustrating an operation flow of the device information management system according to the third embodiment.

FIG. 25 is a flowchart schematically illustrating the processing of the device information management system 1601 according to the third embodiment. The operations of the device information management system 1601 according to the third embodiment will be described with reference to FIGS. 20 through 25.

At the device information management system 1601 according to the third embodiment, first, in step S2001, the correlation detecting unit 1603 operates the device 1608. The correlation detecting unit 1603 also interprets change in electric power consumption per unit time for each branch circuit, and estimates the branch circuit to which the operated device 1608 is connected. The correlation detecting unit 1603 correlates the operated device and the estimated branch circuit. Details of this processing will be described later with reference to FIG. 26.

Next, in step S2002, the data management unit 1701 of the device management unit 1602 determines whether or not the device that is the object of operation in step S2001 is a device already registered in the device information 600 (i.e., a device managed by the device management unit 1602). In a case where the device that is the object of operation is not a device that has been registered (NO in step S2002), the flow advances to step S2003. On the other hand, in a case where the device that is the object of operation is a device that has already been registered (YES in step S2002), the flow advances to step S2004. In step S2003, the device to be operated is conceived to be a newly-installed device that has been newly installed, so newly-installed device processing is performed. Details of this processing will be described later with reference to FIG. 27.

In step S2004, the determining unit 1703 of the device management unit 1602 determines whether or not the branch circuit correlated with the device that is the object of operation is the same as the branch circuit correlated with the device that is the object of operation in the device information 600 saved in the device information storage unit 204 of the device management unit 1602. In a case where these are the same (YES in step S2004), the processing of FIG. 25 ends. On the other hand, in a case where these are different (NO in step S2004), the flow advances to step S2005. In step S2005, the device that is the object of operation is conceived to have been relocated, so processing for confirmation of relocation is performed. Details of this processing will be described later.

The data string for electric power consumption per unit time for each branch circuit that the measuring unit 106 measures, and the data string that the electric power data management unit 104 saves in the electric power data storage unit 404, are the same as in the first embodiment.

Figure 26:
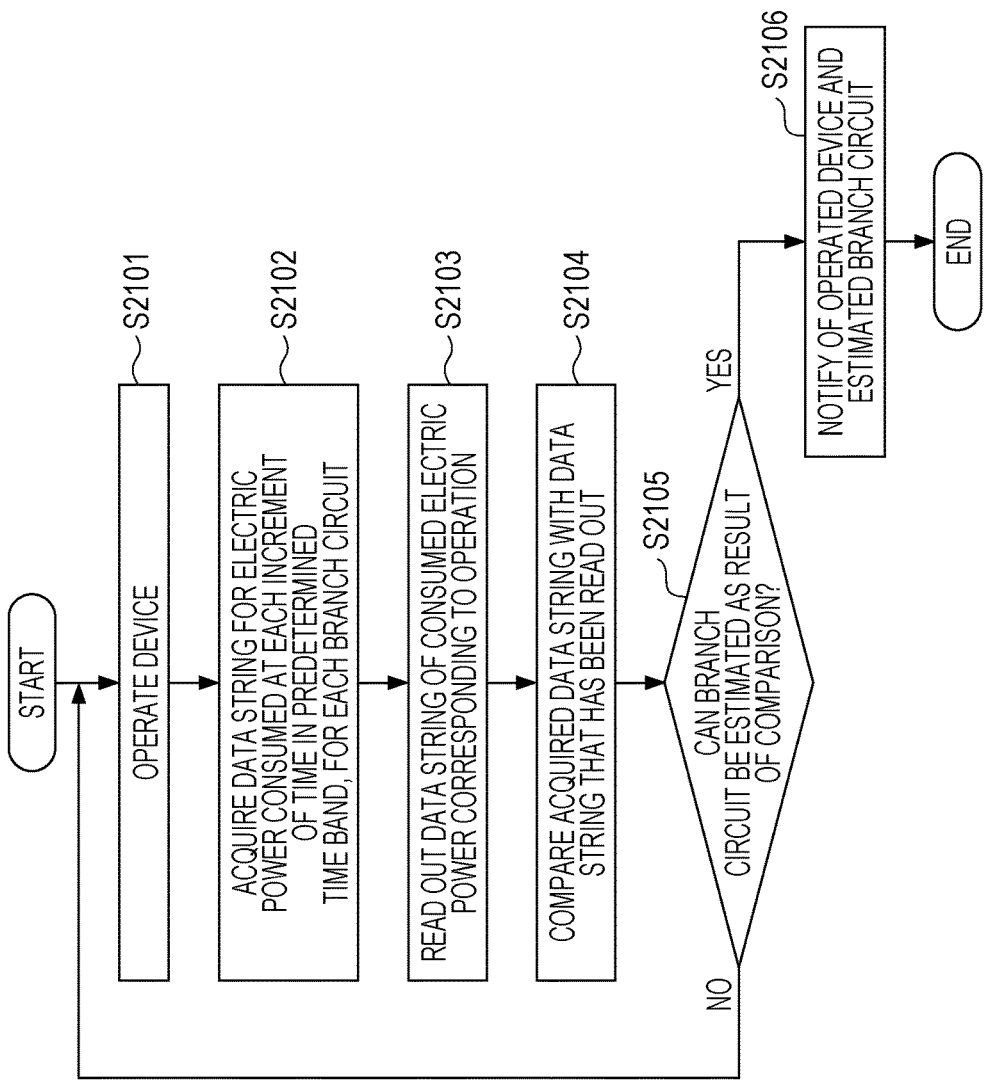
FIG. 26 is a diagram illustrating an operation flow of the correlation detecting unit according to the third embodiment.

FIG. 26 is a flowchart illustrating details of the estimating processing performed by the correlation detecting unit 1603 in step S2001 in FIG. 25. First, in step S2101, the estimating unit 1802 of the correlation detecting unit 1603 requests the operation request unit 1805 to perform predetermined operations as to the device 1608. For example, the estimating unit 1802 requests activation of the device 1608. In response to the requested operation, the device 1608 activates.

Next, in step S2102, the data acquisition unit 301 acquires the data string for electric power consumption per unit time at a predetermined time band before and after the operation in step S2101 from the electric power data management unit 104. The predetermined time band is, for example, a period of 30 minutes from 10 minutes before the clock time of performing the operation until 20 minutes after the clock time of performing the operation, or the like. The length of this period may be decided by the type of operation performed in step S2101 (e.g., turning the air conditioner on).

The predetermined time band may be decided by type of device 1608. For example, a washing machine is running up water for a predetermined amount of time after starting operations (e.g., 10 minutes), so a data string of characteristic electric power consumption is not obtained. Accordingly, in a case where the device 1608 is a washing machine, the period may be 30 minutes, starting 10 minutes after starting operation until 40 minutes after. Thus, the predetermined time band may be decided for a period where characteristics of the device 1608 can be obtained regarding electric power consumption. The processing of this step S2102 is performed regarding all branch circuits 107 connected to the measuring unit 106.

Next, in step S2103, the estimating unit 1802 reads out the data string (electric power data) of electric power consumption regarding the operation performed in step S2101, from the electrical power data saving unit 304.

Next, in step S2104, the estimating unit 1802 compares the data string of the electric power consumption acquired in step S2102 and the electric power data read out in step S2103. The device 1608 here is estimated to be connected to a branch circuit where a data string of electric power consumption having a high image similarity to the electric power data has been measured.

Next, in step S2105, the estimating unit 1802 determines whether or not the branch circuit to which the device 1608 has been connected can be estimated as a result of the comparison in step S2104. For example, if the similarity between the data string acquired in step S2102 and the electric power data read out in step S2103 is a predetermined threshold value or above, the estimating unit 1802 determines that the branch circuit can be estimated. In a case where determination is made that the branch circuit can be estimated (YES in step S2105), the flow advances to step S2106. In a case where determination is made that the branch circuit cannot be estimated (NO in step S2105), the flow returns to step S2101 and the processing is repeated. Thus, the processing of FIG. 26 is continued until the branch circuit is estimated (YES in step S2105).

In a case where the flow returns to step S2101, in step S2101 the second time, the estimating unit 1802 of the correlation detecting unit 1603 may request the operation request unit 1805 for an operation that is different from the operation requested in step S2101 the first time. For example, in a case where activation of the device 1608 was requested in step S2101 the first time, stopping of operations of the device 1608 may be requested in step S2101 the second time.

In step S2106, the estimating unit 1802 hands the device 1608 operated in step S2101 and the estimated branch circuit, to the notifying unit 303. The notifying unit 303 notifies the notification accepting unit 202 of the device management unit 1602 of the device and branch circuit that have been handed thereto.

Note that in step S2102, the data acquisition unit 301 may periodically acquire data strings of electric power consumption from the electric power data management unit 104. In step S2104, the estimating unit 1802 may compare a data string of a predetermined range out of all electric power consumption data strings periodically acquired in step S2102, with the electric power data that has been read out.

Figure 27:
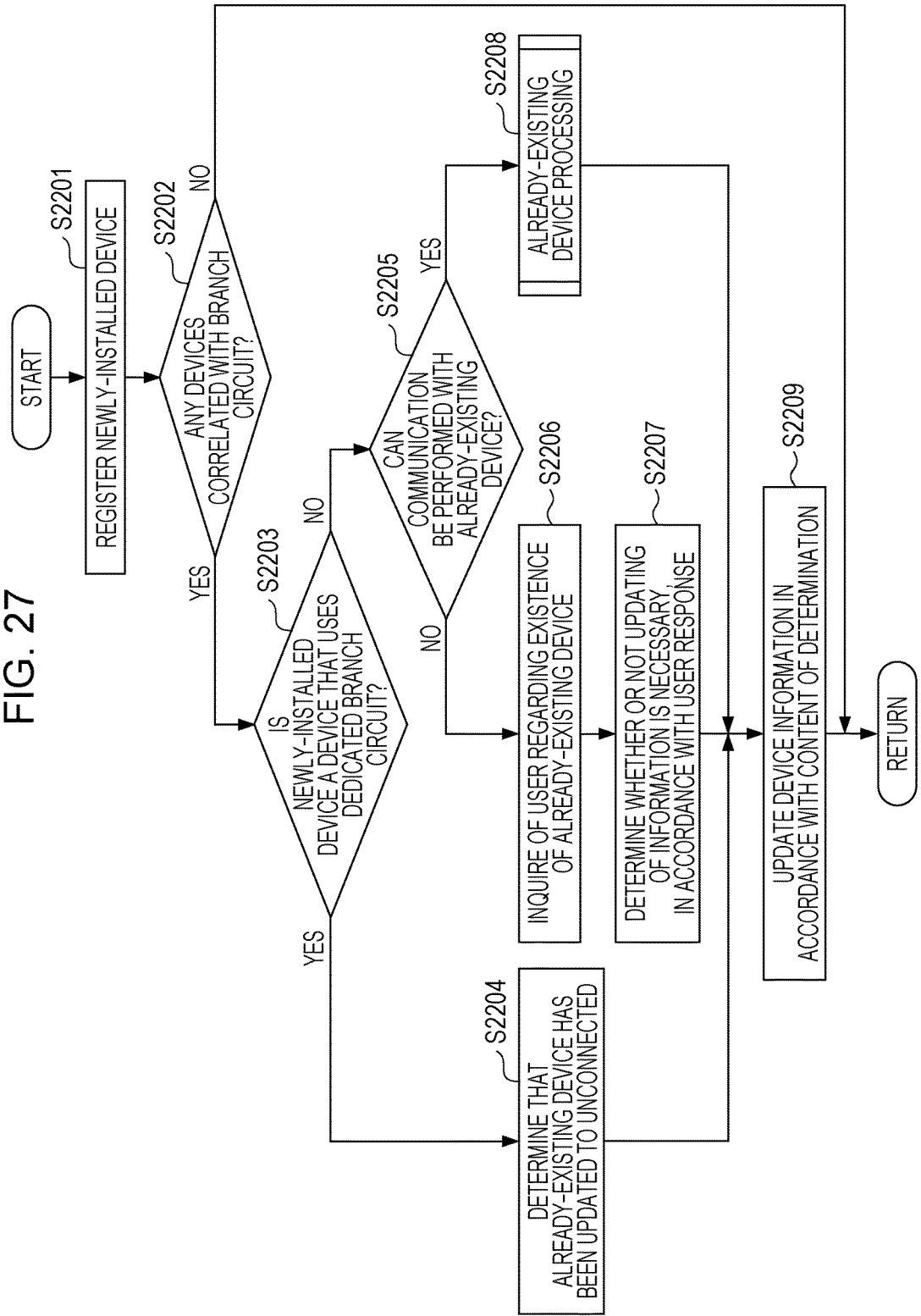
FIG. 27 is a diagram illustrating an operation flow of processing to newly install a device according to the third embodiment.

FIG. 27 is a flowchart illustrating the newly-installed device processing in step S2003 in FIG. 25. First, in step S2201, the data management unit 1701 of the device management unit 1602 registers the information of the device 1608 that the notification accepting unit 202 has received from the correlation detecting unit 1603 in the device information 600 (FIG. 6) in the device information storage unit 204. The data registered in the device information 600 illustrated in FIG. 6 includes the type of device 602 of the operated device 1608, the branch No. 601 to which the device 1608 is estimated to be connected, and information of the device 1608 acquired via the device communication unit 1607 (e.g., model No. 603 of the device).

The correlation detecting unit 1603 may further acquire more detailed information such as the model name, device ID, and so forth, of the device 1608, via the device communication unit 1607. The correlation detecting unit 1603 can acquire detailed information by using an existing standard such as Device Architecture in UPnP or the like, for example. Alternatively, the correlation detecting unit 1603 can acquire detailed information by deciding a communication standard between the device information management system 1601 and device 1608 beforehand, and performing data communication following that communication standard. In the present embodiment, the device information 600 saved in the device information storage unit 204 may include the device ID identifying the device 1608.

Next, in step S2202 (an example of a determining step), the data management unit 1701 searches the device information 600 saved in the device information storage unit 204, and checks whether or not a device correlated with the estimated branch circuit has already been registered. In a case where no device has been registered (NO in step S2202), the newly-installed device processing of FIG. 27 ends with the registration of the newly-installed device (step S2201). On the other hand, in a case where a device has already been registered (YES in step S2202), the flow advances to step S2203. The device already registered here will be referred to as "already-existing device" in the following description of FIG. 27.

In step S2203 (an example of a determining step), the determining unit 1703 determines whether the newly-installed device 1608 registered in step S2201 is a device that uses a dedicated branch circuit or a device that uses a shared branch circuit. In a case where the newly-installed device is a device that uses a dedicated branch circuit (YES in step S2203), the flow advances to step S2204. On the other hand, in a case where the newly-installed device is a device that uses a shared branch circuit (NO in step S2203), the flow advances to step S2205.

In step S2204, the determining unit 1703 determines that the already-existing device has been updated to an unconnected state. The estimated newly-installed device 1608 is a device that uses a dedicated branch circuit, so it is conceivable that there are no other devices connected. Accordingly, determination can be made that the already-existing device that had been previously connected has been replaced by the newly-installed device, without inquiring of the user.

In step S2205 (an example of a determining step), the determining unit 1703 commissions the device communication unit 1607 to check whether or not communication with the already-existing device is possible. If communication with the already-existing device is possible (YES in step S2205), the processing advances to step S2208. On the other hand, if communication with the already-existing device is not possible (NO in step S2205), the processing advances to step S2206.

For example, in a case where the already-existing device is the device 1608a, 1608b, or 1608c, determination is made that communication is possible, since these are connected to the device interface 1609. On the other hand, in a case where the already-existing device is the device 1608*d*, determination is made that communication is not possible, since it is not connected to the device interface 1609.

In step S2206 (an example of a transmission step), the determining unit 1703 commissions the user communication unit 105 (an example of a transmission unit) to inquire of the user regarding the existence of an already-existing device. This is because the already-existing device is a device on a shared branch circuit used by multiple devices, and further communication with the already-existing device is not possible, so determination regarding whether or not the already-existing device is continuously connected to the branch circuit is difficult.

Next, in step S2207, the determining unit 1703 determines whether or not the already-existing device needs updating, in accordance with the user response received from the user communication unit 105. That is to say, if there is a response from the user to the effect that the already-existing device is continuously connected, the determining unit 1703 determines that updating is unnecessary. On the other hand, if there is a response from the user to the effect that the already-existing device has been disconnected, the determining unit 1703 determines that the already-existing device has been updated to an unconnected state. The processing in step S2206 and step S2207 is the same as the processing in step S1305 and step S1306 described in FIG. 13 in the first embodiment.

In step S2208, the data management unit 1701 of the device management unit 1602 suspends updating of device information relating to the already-existing device. After the processing in step S2209 ends, the processing illustrated in FIG. 25 is then performed in continuation on the already-existing device, thereby setting the device information management system 1601 in step S2208 so that the branch circuit to which the already-existing device is connected is estimated and device information is updated.

Next, in step S2209, the data management unit 1701 updates the device information 600 relating to the already-existing device saved in the device information storage unit 204, in accordance with the contents of determination made by the determining unit 1703 in step S2204 and step S2207.

Note that a configuration may be made where in step S2204, processing the same as in step S2205 through step S2208 is performed.

Next, the processing for confirmation of relocation, in step S2005 in FIG. 25, will be described in detail. The processing for confirmation of relocation in step S2005 is of the same configuration as the processing for confirmation of relocation in step S1005 in the first embodiment illustrated in FIG. 14.

Note that in the third embodiment, the determining unit 1703 may commission the device communication unit 1607 in step S1204 in FIG. 14 to check whether or not communication with the already-existing device is possible. If communication with the already-existing device is not possible, the determining unit 1703 may determine that the already-existing device has been updated to an unconnected state. If communication with the already-existing device is possible, the determining unit 1703 may suspend updating of the device information relating to the already-existing device. Further, after the processing in step S1205 ends, the processing illustrated in FIG. 25 may then be performed in continuation on the already-existing device, thereby setting the device information management system 1601 so that the branch circuit to which the already-existing device is connected is estimated and device information is updated.

Note that the operations of the device information management system 1601 according to the third embodiment as illustrated in FIG. 25 may be of a configuration of being executed in accordance with a user request. Also, a configuration may be made where the operations are performed periodically (e.g., daily) on the devices 1608 managed by the device management unit 1602. Also, a configuration may be made where the operations are performed by the device 1608 when there is a request from the device information management system 1601.

Thus, according to the device information management system 1601 of the third embodiment described above, notification to the user, or making confirmation with the user, can be performed only when necessary, in accordance with information of the device 1608. This is advantageous in that ease of use for the user is improved.

This also is advantageous in that whether or not there is need to make confirmation with the user is appropriately judged in accordance with the type of device 1608 (regarding whether a device using a dedicated branch circuit or a device using a shared branch circuit, for example), improving ease of use for the user.

The measuring unit 106 may further transmit voltage information of the branch circuit 107 to the device information management system 1601. The device management unit 1602 of the device information management system 1601 may further manage voltage information of the branch circuit 107. The determining unit 1703 of the device management unit 1602 may first determine whether or not the branch circuit 107 is a dedicated branch circuit, according to voltage information of the branch circuit 107 to which the device has been connected, in step S2203 (FIG. 27) and step S1201 (FIG. 14). The determining unit 1703 may determine that the branch circuit 107 is a dedicated branch circuit if the voltage of the branch circuit 107 is 200 V, for example. The determining unit 1703 may be of a configuration to perform the above-described determination in a case where determination could not be made whether the branch circuit 107 is a dedicated branch circuit or not from the voltage information of the branch circuit 107.

According to this configuration, notification to the user, or making confirmation with the user, can be performed only when necessary, in accordance with voltage information of the branch circuit 107. This is advantageous in that ease of use for the user is improved.

The device communication unit 1607 may further receive notification of a state change of the device 1608 that the device 1608 transmits via the device interface 1609, and the date and time when the state change occurred, and hand the received notification to the device management unit 1602. The device information reception unit 1705 of the device management unit 1602 may further receive the notification of the state change and date and time of the occurrence, and hand the received notification to the data management unit 1701. The data management unit 1701 may hand the received notification of the state change and date and time of the occurrence to the correlation detecting unit 1603. The estimating unit 1802 of the correlation detecting unit 1603 may estimate the branch circuit to which the device 1608 is connected, by further detecting change in the received data string for electric power consumption per unit time due to state change in the device 1608, from data strings for electric power consumption per unit time for each branch circuit, obtained by the data acquisition unit 301. Detection of change in the data strings for electric power consumption per unit time can be performed by processing of the same method as described above.

Now, change in the state of the device 1608 includes those due to user operations, such as starting or stopping the device 1608, changing operating mode such as cooling and heating, changing settings such as changing the set temperature and so forth, and those determined by the device 1608 itself in accordance with the environment, such as temperature and the like. Note that notification of state change of the device 1608 can be realized by that defined in ECHONET Lite or using eventing in UPnP. In a case where the date and time of occurrence is not notified from the device 1608, the date at which the device interface 1609 received the state change, or the date and time that the device communication unit 1607 received the state change may be used. In this case, the estimating unit 1802 of the correlation detecting unit 1603 may increase the time band of electric power data to be interpreted, so that the date and time of occurrence of the state change of the device 1608 is included in the interpreted time band. This enables the above processing.

Fourth Embodiment

The following is a description of a fourth embodiment of the device information management system according to the present disclosure. Only points that differ from the third embodiment will be described in the fourth embodiment.

The device information 600 managed by the device management unit 1602 includes the date detected 605, as illustrated in FIG. 6. The date detected 605 represents, of dates that estimation has been made by the estimating unit 1802 of the correlation detecting unit 1603 regarding the branch circuit 107, that the device 1608 is connected thereto, the date closest to the current point-in-time. That is, upon being notified by the notification accepting unit 202 regarding the operated device and estimated branch circuit in step S2106 in FIG. 26, the data management unit 1701 stores the date thereof. In the newly-established device processing in step S2003 in FIG. 25, the processing for confirmation of relocation in step S2005, and the period confirmation processing in step S2401 in FIG. 28 which will be described later, the data management unit 1701 saves the device information 600 including the date thereof, in the device information storage unit 204.

Figure 28:
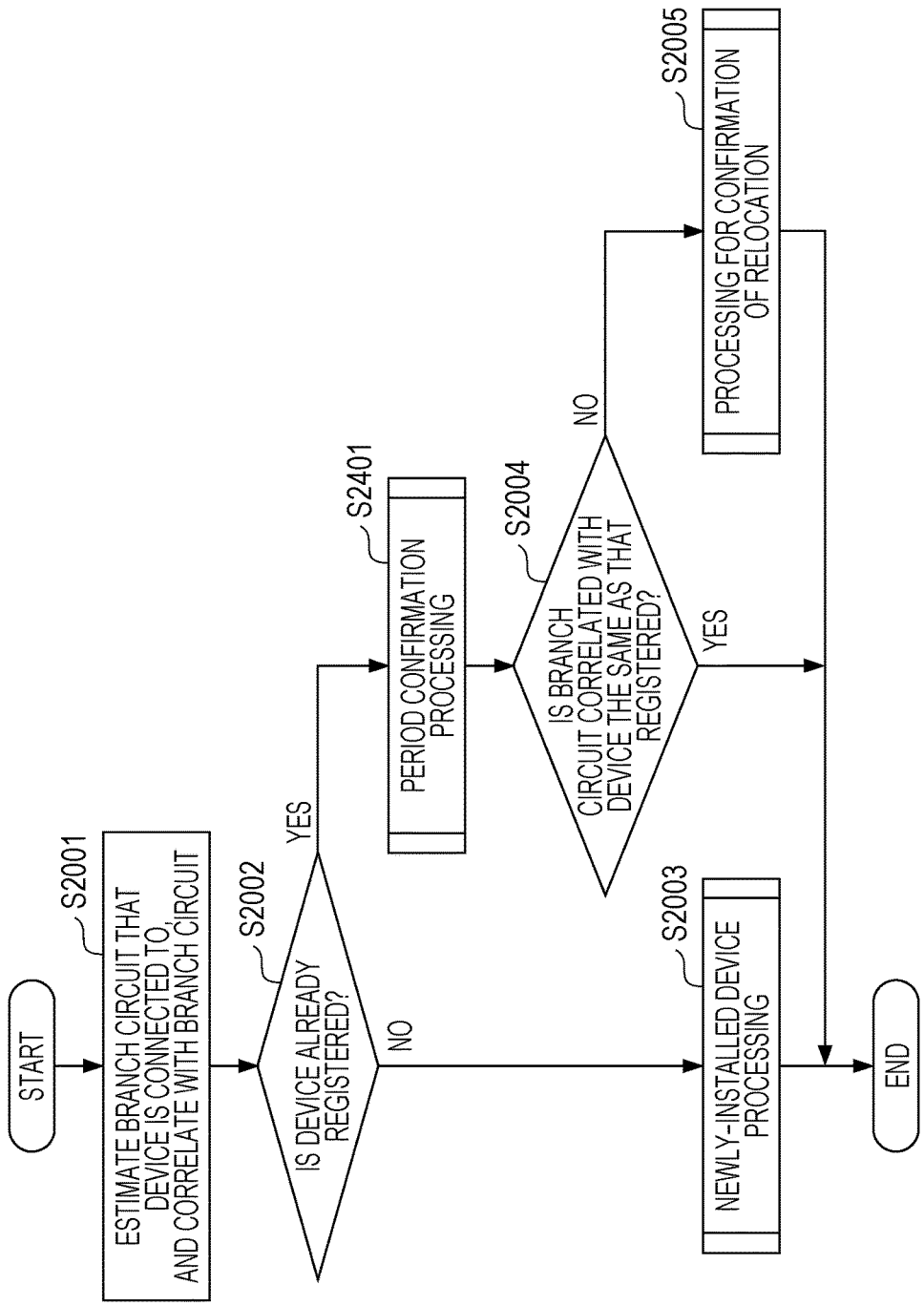
FIG. 28 is a diagram illustrating an operation flow of a device information management system according to a fourth embodiment.

FIG. 28 is a flowchart schematically illustrating the processing of the device information management system 1601 according to the fourth embodiment. The flowchart in FIG. 28 differs from the flowchart in the third embodiment illustrated in FIG. 25 with regarding to the point that the period confirmation processing in step S2401 is performed prior to step S2004 in a case where the device that is the object of operation is a device that already has been registered (YES in step S2002).

The period confirmation processing in step S2401 is the same as the period confirmation processing in step S1009 in the second embodiment illustrated in FIG. 16. That is to say, the same processing as in the flowchart in FIG. 17 is performed in the period confirmation processing in step S2401.

As described above, determination is made that a device connected to the branch circuit estimated by the estimating unit 1802 of the correlation detecting unit 1603 has not been used for a predetermined period (three months in the present embodiment). Accordingly, a message is transmitted to the user terminal 109 in a case where the device is a heating device in the fourth embodiment, prompting the user to perform inspection for safe use, in the same way as in the second embodiment. This is advantageous in that ease of user for the user is improved.

Note that the device management unit 1602 may further manage the period regarding which a device connected to the estimated branch circuit is continuously detected. A configuration may be made where the user communication unit 105 transmits a message to the user terminal 109 in a case where this period exceeds a threshold value decided beforehand. In this case, the device information 600 managed by the device management unit 102 includes the date detected 605, previous date detected 606, and number of consecutively-detected days 607, as illustrated in FIG. 6.

For example, if the air conditioner is being detected consecutively for one month or more, the user communication unit 105 transmits a message to inspect the filter, such as illustrated in FIG. 19. Determination of this "consecutive" by the determining unit 1703 may be a configuration where it is deemed to be "consecutive" only in a case where detected days are consecutive, or may be a configuration where it is deemed to be "consecutive" if a missing period therein is within a particular period such as one day, even if not consecutive.

Fifth Embodiment

Figure 29:
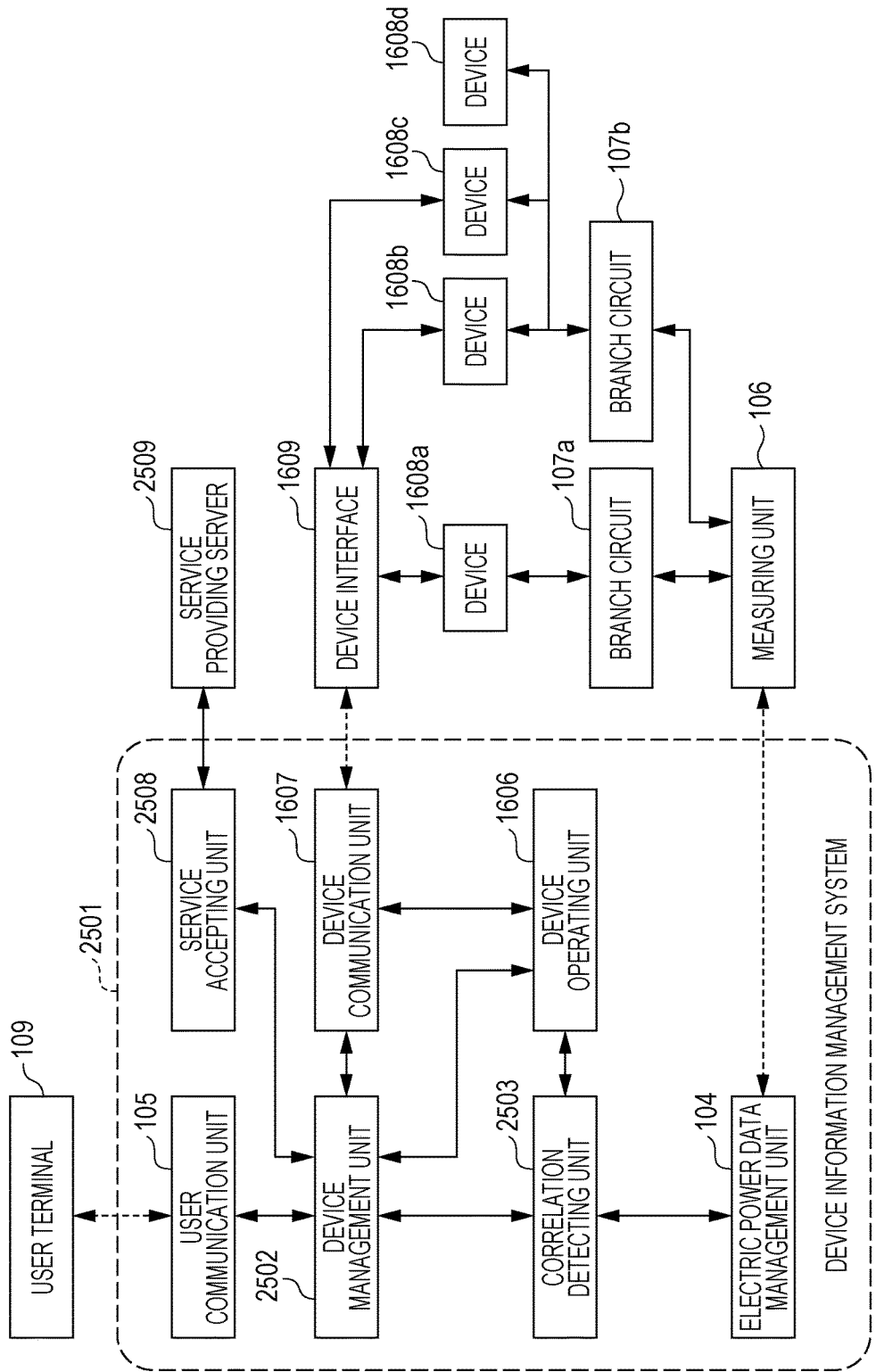
FIG. 29 is a diagram illustrating an operation flow of a device information management system according to a fifth embodiment.

The following is a description of a fifth embodiment of a device information management system according to the present disclosure, with reference to the drawings. FIG. 29 is a block diagram schematically illustrating the configuration of the device information management system according to the fifth embodiment of the present disclosure. In FIG. 29, the device information management system 2501 according to the fifth embodiment includes a device management unit 2502, a correlation detecting unit 2503, the electric power data management unit 104, the user communication unit 105, the device operating unit 1606, the device communication unit 1607, and a service accepting unit 2508. The device information management system 2501 includes a CPU and memory, for example. Note that the device information management system 2501 is not restricted to a CPU, and may include other hardware.

A service providing server 2509 provides services relating to operations of the device 1608. Note that the electric power data management unit 104, user communication unit 105, device communication unit 1607, device 1608, device interface 1609, branch circuit 107, measuring unit 106, and user terminal 109 are the same as those in the third embodiment illustrated in FIG. 20, and accordingly are denoted by the same reference numerals. Hereinafter detailed description of these will be omitted. Also, the device operating unit 1606 differs from the device operating unit 1606 in the third embodiment only with regard to the point that operation requests are accepted not only from the correlation detecting unit 2503 but also from the device management unit 2502.

Figure 30:
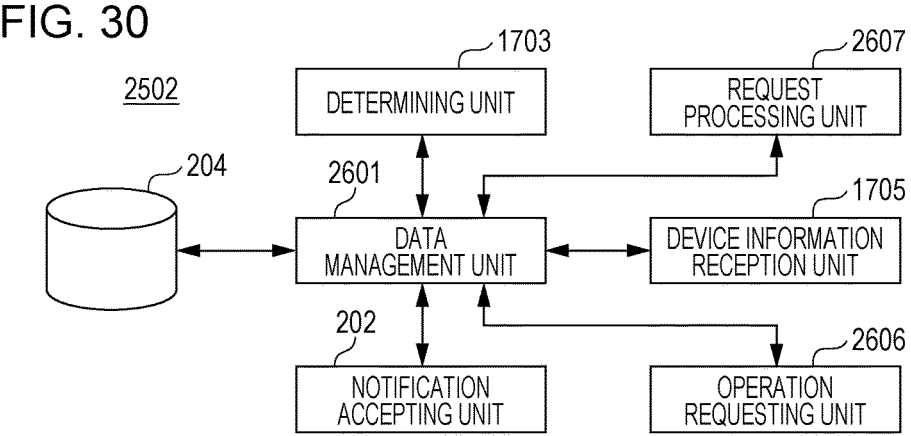
FIG. 30 is a block diagram illustrating an example of the configuration of a device management unit according to the fifth embodiment.

FIG. 30 is a block diagram schematically illustrating the configuration of the device management unit 2502. The device management unit 2502 includes a data management unit 2601, the notification accepting unit 202, the determining unit 1703, the device information storage unit 204, the device information reception unit 1705, an operation requesting unit 2606, and a request processing unit 2607. Of these, the notification accepting unit 202, determining unit 1703, device information storage unit 204, and device information reception unit 1705 are the same as the notification accepting unit 202, determining unit 1703, device information storage unit 204, and device information reception unit 1705 in the third embodiment illustrated in FIG. 21, and accordingly are denoted by the same reference numerals. Hereinafter detailed description of these will be omitted.

The data management unit 2601 manages the device information 600 (FIG. 6) saved in the device information storage unit 204 in the same way as the data management unit 1701 in the third embodiment. The data management unit 2601 newly creates device information 600 and saves in the device information storing unit 204 or updates device information 600 saved in the device information storage unit 204, based on information received from the notification accepting unit 202, the contents of determination received from the determining unit 1703, and information received from the device information reception unit 1705.

Further, the data management unit 2601 hands to the operation requesting unit 2606 an operation request for the device 1608 that the request processing unit 2607 has received from the service accepting unit 2508. The data management unit 2601 receives the response of the device 1608 from the operation requesting unit 2606. The data management unit 2601 saves the response of the device 1608 that has been received in the device information storage unit 204, and hands it to the request processing unit 2607. The data management unit 2601 further notifies the content of the operation of the device 1608 performed as described above, and the date and time of the operation, to a state change acquisition unit 2706 (FIG. 31) of the correlation detecting unit 2503.

In response to the operation request handed from the data management unit 2601, the operation requesting unit 2606 commissions the device operating unit 1606 to operate the device 1608. The operation requesting unit 2606 receives the operation results from the device operating unit 1606. The operation requesting unit 2606 hands the received results of operation to the data management unit 2601.

The request processing unit 2607 commissions the data management unit 2601 to operate the device 1608 under request from the service accepting unit 2508. The request processing unit 2607 receives the operation results from the data management unit 2601. The request processing unit 2607 hands the received operation results to the service accepting unit 2508.

Figure 31:
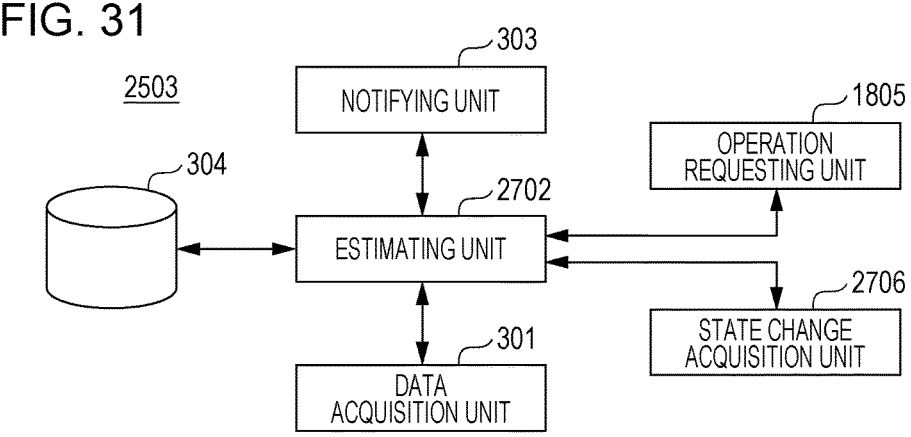
FIG. 31 is a block diagram illustrating an example of the configuration of a correlation detecting unit according to the fifth embodiment.

FIG. 31 is a block diagram schematically illustrating the configuration of the correlation detecting unit 2503. The correlation detecting unit 2503 includes the data acquisition unit 301, an estimating unit 2702, the notifying unit 303, the electric power data storage unit 304, the operation request unit 1805, and the state change acquisition unit 2706. Of these, the data acquisition unit 301, notifying unit 303, electric power data storage unit 304, and operation request unit 1805 are the same as the data acquisition unit 301, notifying unit 303, electric power data storage unit 304, and operation request unit 1805 in the third embodiment illustrated in FIG. 22, and accordingly are denoted by the same reference numerals. Hereinafter detailed description of these will be omitted.

In addition to the same estimation method as in the third embodiment, the estimating unit 2702 acquires information of operation performed at the device 1608 via the state change acquisition unit 2706. Also, the estimating unit 2702 acquires data strings for electric power consumption per unit time for each branch circuit, in a time band before and after and including operation of the device 1608 that the acquired information indicates by using the data acquisition unit 301. The estimating unit 2702 compares the electric power data measured by operating the device 1608, saved in the electric power data storage unit 304, and the acquired data string, to estimate the branch circuit where the device 1608 is connected, and if estimation is successful, hands the device 1608 that has been operated and the estimated branch circuit to the notifying unit 303.

The electric power data storage unit 304 saves, for each type of device 801 and each operation/action 803, a data string 903 of electric power consumption per unit time, measured by that operation/action, which has been described with reference to FIGS. 8 and 9. This data string of electric power consumption will be referred to as electric power data hereinafter.

The state change acquisition unit 2706 receives the content of operation performed at the device 1608, and the date of the operation, from the data management unit 2601 of the device management unit 2502. The state change acquisition unit 2706 hands the received content of the operation and date and time to the estimating unit 2702.

Figure 32:
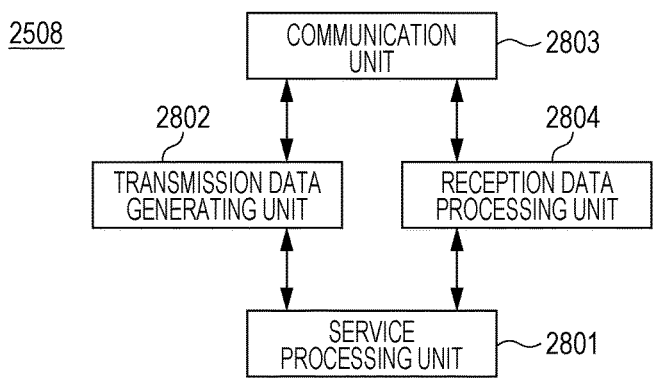
FIG. 32 is a block diagram illustrating an example of the configuration of a service accepting unit according to the fifth embodiment.

FIG. 32 is a block diagram schematically illustrating the configuration of the service accepting unit 2508. The service accepting unit 2508 includes a service providing unit 2801, a transmission data generating unit 2802, a communication unit 2803, and a reception data processing unit 2804.

The transmission data generating unit 2802 generates data to be transmitted to the service providing server 2509, based on a commission content from the service providing unit 2801. The reception data processing unit 2804 processes data received from the service providing server 2509 and extracts a message. The reception data processing unit 2804 hands the extracted message to the service providing unit 2801. The communication unit 2803 communicates with the service providing server 2509. The communication unit 2803 is equivalent to a network interface of an IP network, or the like.

The service providing unit 2801 generates content of a commission to the service providing server 2509. The service providing unit 2801 processes the message from the service providing server 2509 that has been handed from the reception data processing unit 2804. Processing by the service providing unit 2801 includes extracting an operation request for the device 1608 from the message from the service providing server 2509, handing the extracted operation request to the device management unit 2502, extracting the results of operation of the device 1608 received from the device management unit 2502, and handing the extracted results of operation to the transmission data generating unit 2802.

The transmission data generating unit 2802 generating data to transmit to the service providing server 2509 includes generating data to notify of the results of operation performed as to the device 1608. The service providing unit 2801 may also create a graphical user interface (GUI) for the service providing server 2509 to present to the user.

The service providing server 2509 presents the user with a user interface for performing operation of the device 1608, typically a GUI. The service providing server 2509 receives an operation request for the device 1608 from the user using the user interface. The service providing server 2509 commissions the service accepting unit 2508 to perform the operation of the device 1608 that the user has requested. The service providing server 2509 receives the operation results from the service accepting unit 2508. The service providing server 2509 presents the user with the received operation results on the user interface. Note that the service providing server 2509 may be of a configuration that does not present operation results.

Communication between the service accepting unit 2508 and the service providing server 2509 can be realized by displaying a GUI in a Web browser using Hyper Text Markup Language (HTML) or JavaScript (a registered trademark), and upon receiving user input, transmitting the content of the user input. The above communication may be performed using HTTP. Alternatively, the above communication may be performed using a method independently decided between the service accepting unit 2508 and service providing server 2509.

Operations of the device information management system 2501 according to the fifth embodiment will be described below. The operations of the device information management system 2501 according to the fifth embodiment differ from the operations of the device information management system according to the third embodiment, illustrated in the flowchart in FIG. 25, only regarding the operation of step S2001. That is to say, the operation performed as to the device 1608 in step S2001 in the third embodiment (FIG. 25) was performed by the device information management system 1601, whereas the user performs the operation as to the device 1608 in step S2001 in the fifth embodiment. Processing that the correlation detecting unit 2503 performs in step S2001 in the fifth embodiment will be described below with reference to FIG. 33.

FIG. 33 is a flowchart illustrating the details of estimation processing that the correlation detecting unit 2503 according to the fifth embodiment performs in step S2001 in FIG. 25. First, in step S3101 (an example of a second acquisition step), in the correlation detecting unit 2503 the estimating unit 2702 (an example of a second acquisition unit) acquires, from the state change acquisition unit 2706, the content of operation performed at the device 1608 and the date thereof, that the state change acquisition unit 2706 has received from the data management unit 2601 of the device management unit 2502.

Next, in step S3102 (an example of a first acquisition step), the data acquisition unit 301 (an example of a first acquisition unit) acquires, from the electric power data management unit 104, a data string for electric power consumption per unit time, in a predetermined time band before and after the date and time of the operation, that the state change acquisition unit 2706 has received. The predetermined time band is, for example, a period of 30 minutes from 10 minutes before the clock time of performing the operation until 20 minutes after the clock time of performing the operation, or the like. The length of this period may be decided by the type of operation handed over in step S3101. This processing is performed for all branch circuits 107 connected to the measuring unit 106.

Next, in step S3103, the estimating unit 2702 reads out from the electric power data storage unit 304 the data string (electric power data) of electric power consumption corresponding to the state change due to the operation acquired in step S3101.

Next, in step S3104 (an example of an estimating step), the estimating unit 2702 compares the data string acquired in step S3102 and the electric power data read out in step S3103. The device 1608 here is estimated to be connected to a branch circuit where a data string of electric power consumption having a high image similarity to the electric power data has been measured.

Next, in step S3105, the estimating unit 2702 determines whether or not the branch circuit to which the device 1608 has been connected can be estimated as a result of the comparison in step S3104. For example, if the similarity between the data string acquired in step S3102 and the electric power data read out in step S3103 is a predetermined threshold value or above, the estimating unit 2702 determines that the branch circuit can be estimated. In a case where determination has been made that the branch circuit can be estimated (YES in step S3105), the flow advances to step S3106. On the other hand, in a case where determination is made that the branch circuit cannot be estimated (NO in step S3105), the flow returns to step S3101 and the processing is repeated. Thus, the processing of FIG. 33 is continued until the branch circuit is estimated (YES in step S3105).

In step S3106, the estimating unit 2702 hands the device 1608 and the estimated branch circuit, to the notifying unit 303. The notifying unit 303 notifies the notification accepting unit 202 of the device management unit 2502 of the device 1608 and branch circuit that have been handed thereto.

Note that in step S3102, the data acquisition unit 301 may periodically acquire data strings of electric power consumption from the electric power data management unit 104. In step S3104, the estimating unit 2702 may compare a data string of a predetermined range out of all electric power consumption data strings periodically acquired in step S3102, with the electric power data that has been read out.

According to the device information management system 2501 of the fifth embodiment described above, notification to the user, or making confirmation with the user, can be performed only when necessary, in accordance information of the device 1608. This is advantageous in that ease of use for the user is improved.

Whether or not user configuration is necessary can be appropriately judged in accordance with the type of device 1608 (e.g., whether device that uses dedicated branch circuit or device that uses shared branch circuit), which is advantageous in that ease of use for the user is improved.

Note that the device communication unit 1607 may further receive notification of state change of the device 1608 that the device 1608 transmits via the device interface 1609, and the data and time at which the state change occurred, and hand the received notification to the device management unit 2502. The device information reception unit 1705 of the device management unit 2502 further may receive the notification of the state change and date and time of occurrence, and hand the received notification to the data management unit 2601. The data management unit 2601 may hand the received notification of state change and date and time of occurrence to the correlation detecting unit 2503. The estimating unit 2702 of the correlation detecting unit 2503 may perform detection processing the same as that described above, using the notification of state change and date and time of occurrence, thereby estimating the branch circuit to which the device 1608 is connected.

Now, change in the state of the device 1608 includes those due to user operations, such as starting or stopping the device 1608, changing operating mode such as cooling and heating, changing settings such as changing the set temperature and so forth, and those determined by the device 1608 itself in accordance with the environment, such as temperature and the like. Note that notification of state change of the device 1608 can be realized by that defined in ECHONET Lite or using eventing in UPnP. In a case where the date and time of occurrence is not notified from the device 1608, the date and time at which the device interface 1609 received the state change, or the date and time that the device communication unit 1607 received the state change may be used. In this case, the estimating unit 2702 of the correlation detecting unit 1603 may increase the time band of electric power data to be interpreted, so that the date and time of occurrence of the state change of the device 1608 is included in the interpreted time band. This enables the above processing.

Note that modifications described in the third embodiment can also be provided in the fifth embodiment. Also, modifications made to the third embodiment within the fourth embodiment, can also be made to the fifth embodiment.

Other Modifications

The present disclosure has thus been described above based on embodiments, but the present disclosure is not restricted to the above embodiments. The following cases are also included in the present disclosure.

(1) Part or all of the components making up the above-described systems may be configured as one system LSI (Large Scale Integration). A system LSI is a super-multi-functional LSI fabricated with multiple components integrated on a single chip, and specifically is a computer system configured including a microprocessor, ROM. RAM, and so forth. The RAM stores the computer program. The system LSI achieves its functions by the microprocessor operating according to the computer program.

(2) Part or all of the components making up the above-described systems may be configured as an IC card detachably mountable to each device, or a standalone module. The IC card or the module is a computer system configured including a microprocessor, ROM, RAM, and so forth. The IC card or the module may include the above-described super-multifunctional LSI. The IC card or the module achieves its functions by the microprocessor operating according to the computer program. The IC card or the module may be tamper-resistant.

(3) The device information management system according to the present disclosure may be the methods illustrated above, may be a computer program which realizes these methods by a computer, or may be digital signals made up of the computer program. The device information management system according to the present disclosure may be the computer program or the digital signals recorded in a computer-readable recording medium, such as for example, a flexible disk, hard disk, CD-ROM, MO, DVD, DVD-ROM, DVD-RAM, BD (Blu-ray (a registered trademark) Disc), semiconductor memory, or the like. The present disclosure may also be the computer program or the digital signals recorded in these recording mediums.

The device information management system according to the present disclosure may be an arrangement where the computer program or the digital signals are transmitted over an electric communication line, wireless or cable communication line, a network of which the Internet is representative, data broadcasting, or the like. The device information management system according to the present disclosure may be a computer system having a microprocessor and memory, where the memory stores the computer program, and the microprocessor operates according to the computer program. This may also be carried out by another independent computer system, by the program or digital signals being recorded in the recording medium and being transported, or by the program or digital signals being transferred over the network or the like.

(4) The above embodiments and modifications may each be combined.

The device management apparatus and device management method according to the present disclosure perform correlation between devices installed in the home and branch circuits to which the devices are connected, and notify or make confirmation with the user as necessary, and is applicable to home appliances and other devices that user electric power in order to perform energy management and prompt maintenance of devices.

What is claimed is:

1. A device management method using a device management apparatus, including a processor, that manages information of devices installed in a home, a power meter and a user terminal, the device management apparatus, the power meter and the user terminal being connected with each other via a network, the method comprising:

acquiring, by the power meter, electric power consumption per unit time in predetermined time intervals, for each of branch circuits of a power distribution board to which the devices can be connected;

estimating an existence of a first device connected to a branch circuit, based on a change in the electric power consumption over time;

determining that the first device estimated to be connected to the branch circuit in the estimating, satisfies a predetermined condition;

transmitting inquiry information to the user terminal via the network, in accordance with the predetermined condition, in response to determining that the first device satisfies the predetermined condition, estimating an existence of a second device connected to the branch circuit, based on a change in the electric power consumption over time; and determining that the second device estimated to be connected to the branch circuit in the estimating, does not satisfy the predetermined condition, wherein the inquiry information is not transmitted from the device management apparatus to the user terminal via the network, in response to determining that the second device does not satisfy the predetermined condition, wherein the determining that the second device does not satisfy the predetermined condition includes:

determining, by referencing management information, that the second device is not registered in the management information, wherein the management information includes the devices installed in the home and the branch circuits that are correlated by the branch circuits;

determining, in response to determining that the second device is not registered in the management information, that the second device is a newly-installed device that has been newly installed in the home, registering, into the management information, the newly-installed device to be correlated with the branch circuit, in response to determining that the second device is the newly-installed device, determining that an already-existing device, which is different from the newly-installed device, has been correlated with the branch circuit in the management information, determining in response to determining that the already-existing device has been correlated with the branch circuit in the management information, that the newly-installed device is a device that independently uses the branch circuit as a dedicated branch circuit, determining, in response to determining that the newly-installed device uses the dedicated branch circuit, that the already-existing device has been replaced by the newly-installed device, and determining, in response to determining that the already-existing device has been replaced by the newly-installed device, that the predetermined condition is not satisfied.

2. A device management method using a device management apparatus, including a processor, that manages information of devices installed in a home, a power meter and a user terminal, the device management apparatus, the power meter and the user terminal being connected with each other via a network, the method comprising:
acquiring, by the power meter, electric power consumption per unit time in predetermined time intervals, for each of branch circuits of a power distribution board to which the devices can be connected;
estimating an existence of a first device connected to a branch circuit, based on a change in the electric power consumption over time;
determining that the first device estimated to be connected to the branch circuit in the estimating, satisfies a predetermined condition;
transmitting inquiry information to the user terminal via the network, in accordance with the predetermined condition, in response to determining that the first device satisfies the predetermined condition;
estimating an existence of a second device connected to the branch circuit, based on a change in the electric power consumption over time; and
determining that the second device estimated to be connected to the branch circuit in the estimating, does not satisfy the predetermined condition;
wherein the inquiry information is not transmitted from the device management apparatus to the user terminal via the network, in response to determining that the second device does not satisfy the predetermined condition,
wherein the determining that the first device satisfies the predetermined condition includes:
determining, by referencing management information that the first device is not registered in the management information, wherein the management information includes the devices installed in the home and the branch circuits that are correlated by the branch circuits;
determining, in response to determining that the first device is not registered in the management information, that the first device is a newly-installed device that has been newly installed in the home,
registering, into the management information, the newly-installed device to be correlated with the branch circuit, in response to determining that the first device is the newly-installed device,
determining that an already-existing device, which is different from the newly-installed device, has already been correlated with the branch circuit in the management information,
determining, in response to determining that the already-existing device has already been correlated with the branch circuit in the management information, that the newly-installed device is a device that shares the branch circuit as a shared branch circuit with other devices,
determining, in response to determining that the newly-installed device uses the shared branch circuit, that the first device satisfies the predetermined condition,
wherein the transmitting the inquiry information includes:
transmitting, to the user terminal via the network, the inquiry information inquiring whether or not the already-existing device is connected to the shared branch circuit,
wherein the device management method further comprises:
receiving, from the user terminal over the network, a response to the transmitted inquiry information; and
determining whether or not to update information relating to the already-existing device in the management information, in accordance with the content of the response.

3. A device management method using a device management apparatus, including a processor, that manages information of devices installed in a home, a power meter and a user terminal, the device management apparatus, the power meter and the user terminal being connected with each other via a network, the method comprising:
acquiring, by the power meter, electric power consumption per unit time in predetermined time intervals, for each of branch circuits of a power distribution board to which the devices can be connected;
estimating an existence of a first device connected to a first branch circuit, based on a change in the electric power consumption over time;
determining that the first device estimated to be connected to the first branch circuit in the estimating, satisfies a predetermined condition;
transmitting, from the device management apparatus to the user terminal via the network, inquiry information, in response to determining that the first device satisfies the predetermined condition,
estimating an existence of a second device connected to the first branch circuit, based on a change in the electric power consumption over time; and
determining that the second device estimated to be connected to the branch circuit in the estimating, does not satisfy the predetermined condition;
wherein the inquiry information is not transmitted from the device management apparatus to the user terminal via the network, in response to determining that the second device does not satisfy the predetermined condition,
wherein the determining that the first device satisfies the predetermined condition includes:
determining, by referencing management information, that the first device is correlated with a second branch circuit in the management information, wherein the second branch circuit is different from the first branch circuit, and wherein the management information includes the devices installed in the home and the branch circuits that are correlated by the branch circuits;
determining, in response to determining that the first device is correlated with the second branch circuit in the management information, that the first device is a relocated device that has been relocated from a first location of connection to the second branch circuit to a second location of connection to the first branch circuit,
determining, in response to determining that the first device is the relocated device, that the relocated device is not a device that independently uses the second branch circuit as a dedicated branch circuit,
determining, in response to determining that the relocated device does not use the dedicated branch circuit, that the first device satisfies the predetermined condition,
wherein the transmitting the inquiry information includes:
transmitting, to the user terminal via the network, the inquiry information inquiring whether or not the relocation of the relocated device from the first location to the second location is temporary.

4. A device management method using a device management apparatus, including a processor, that manages information of devices installed in a home, a power meter and a user terminal, the device management apparatus, the power meter and the user terminal being connected with each other via a network, the method comprising:

acquiring, by the power meter, electric power consumption per unit time in predetermined time intervals, for each of branch circuits of a power distribution board to which the devices can be connected;

estimating an existence of a first device connected to a first branch circuit, based on a change in the electric power consumption over time;

determining that the first device estimated to be connected to the first branch circuit in the estimating, satisfies a predetermined condition;

transmitting inquiry information to the user terminal via the network, in accordance with the predetermined condition, in response to determining that the first device satisfies the predetermined condition;

estimating an existence of a second device connected to the first branch circuit, based on a change in the electric power consumption over time; and determining that the second device estimated to be connected to the branch circuit in the estimating, does not satisfy the predetermined condition;

wherein the inquiry information is not transmitted from the device management apparatus to the user terminal via the network, in response to determining that the second device does not satisfy the predetermined condition, wherein the determining that the second device does not satisfy the predetermined condition includes:

determining, by referencing management information, that the second device is correlated with a second branch circuit in the management information, wherein the second branch circuit is different from the first branch circuit, and wherein the management information includes the devices installed in the home and the branch circuits that are correlated by the branch circuits;

determining, in response to determining that the estimated device is correlated with the second branch circuit in the management information, that the second device is a relocated device that has been relocated from a first location of connection to the second branch circuit to a second location of connection to the first branch circuit, determining, in response to determining that the second device is the relocated device, that the relocated device is a device that independently uses the second branch circuit as a dedicated branch circuit, determining, in response to determining that the relocated device uses the dedicated branch circuit, that the second device does not satisfy the predetermined condition.

* * * * *